(12) United States Patent
Watanabe et al.

(10) Patent No.: US 7,304,461 B2
(45) Date of Patent: Dec. 4, 2007

(54) DC/DC CONVERTER

(75) Inventors: Yasuto Watanabe, Wako (JP); Mitsuaki Hirakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 133 days.

(21) Appl. No.: 11/280,237

(22) Filed: Nov. 17, 2005

(65) Prior Publication Data
US 2006/0103359 A1 May 18, 2006

(30) Foreign Application Priority Data
Nov. 18, 2004 (JP) ............................ P2004-334434
Feb. 8, 2005 (JP) ............................ P2005-032173

(51) Int. Cl.
*G05F 1/40* (2006.01)
(52) U.S. Cl. .................... 323/282; 363/16; 363/127
(58) Field of Classification Search ........ 323/282–284, 323/259, 222; 363/16–20, 41, 127, 131
See application file for complete search history.

(56) References Cited

U.S. PATENT DOCUMENTS

| | | | | |
|---|---|---|---|---|
| 5,321,348 | A * | 6/1994 | Vinciarelli et al. | ......... 323/222 |
| 5,434,767 | A * | 7/1995 | Batarseh et al. | ............... 363/16 |
| 5,861,734 | A * | 1/1999 | Fasullo et al. | ............... 323/222 |
| 5,929,614 | A * | 7/1999 | Copple | ......................... 323/222 |
| 6,084,790 | A | 7/2000 | Wong | |
| 6,304,460 | B1 * | 10/2001 | Cuk | ............................ 363/16 |

FOREIGN PATENT DOCUMENTS

| EP | 1 300 934 A1 | 4/2003 |
|---|---|---|
| JP | 2003-111390 A | 4/2003 |
| JP | 2003-216255 A | 7/2003 |

OTHER PUBLICATIONS

Caricchi F et al., "Experimental study of a bidirectional DC-DC converter for the DC link voltage control and the regenerative braking in PM motor drives devoted to electrical vehicles", Applied Power Electronics Conference and Exposition,1994. APEC '94, Conference Proceedings 1994., Ninth Annual Orlando, FL, USA Feb. 13-17, 1994, New York, NY, pp. 381-385, XP010118545 ISBN: 0-7803-1456-5.
Wen et al., 2004 35th Annual IEEE Power Electronics Specialist Conference, Jun. 22, 2004, pp. 1003-1009.

* cited by examiner

*Primary Examiner*—Rajnikant B. Patel
(74) *Attorney, Agent, or Firm*—Birch, Stewart, Kolasch & Birch, LLP

(57) ABSTRACT

Voltage-boosting/lowering DC/DC converter includes a low-voltage-side port and high-voltage-side port, an inductor connected at one end to a positive-pole terminal of the low-voltage-side port, and a transformer of a magnetic-field cancellation type including a primary winding and secondary winding interconnected in an oppositely-wound configuration, a common terminal of the primary winding and secondary winding being connected to the end of the inductor. Switching element controls an energizing current of the primary winding flowing to a common reference terminal, another switching element controls an energizing current of the primary winding flowing to a positive-pole terminal of the high-voltage-side port, still another switching controls an energizing current of the secondary winding flowing to the common reference terminal, and still another switching element controls an energizing current of the secondary winding flowing to the positive-pole terminal of the high-voltage-side port.

25 Claims, 13 Drawing Sheets

ENERGIZATION OF PRIMARY WINDING L1

ENERGIZATION OF PRIMARY WINDING L1

ENERGIZATION OF SECONDARY WINDING L2

ENERGIZATION OF PRIMARY WINDING L1

ENERGIZATION OF SECONDARY WINDING L2

ENERGIZATION OF PRIMARY WINDING L1

ENERGIZATION OF SECONDARY WINDING L2

ENERGIZATION OF PRIMARY WINDING L1

ENERGIZATION OF SECONDARY WINDING L2

DC/DC CONVERTER

FIELD OF THE INVENTION

The present invention relates generally to DC/DC converters, and more particularly to an improved DC/DC converter which is suitable for use in power supply sections of electric vehicles etc. and which can also be suitably reduced in size and weight.

BACKGROUND OF THE INVENTION

Heretofore, there have been proposed various voltage-boosting DC/DC converters (for example, Japanese Patent Laid-Open Publication Nos. 2003-111390 and 2003-216255). FIG. 32 hereof shows a fundamental circuit structure in the conventional voltage-boosting DC/DC converter disclosed in one of the above-identified publications. The voltage-boosting DC/DC converter shown in FIG. 32 is in the form of electric circuitry capable of variable voltage boosting. This voltage-boosting DC/DC converter 100 is constructed using a single coil (i.e., inductor or inductance element) 101.

More specifically, the DC/DC converter 100 of FIG. 32 includes an input-side smoothing capacitor 102, the coil 101, a switching element 103, a diode 104, and an output-side smoothing capacitor 105. The input-side smoothing capacitor 102 is connected between a common reference terminal (ground terminal) 106 and an input terminal 107, and the output-side smoothing capacitor 105 is connected between the common reference terminal 106 and an output terminal 108. Series circuit of the coil 101 and diode 104 is connected between the input terminal 107 and the output terminal 108. The switching element 103 is connected between an intermediate point 109 between the coil 101 and diode 104 and the common reference terminal 106. The switching element 103 is a transistor having bipolar characteristics. Collector of the switching element 103 is connected to the intermediate point 109, and an emitter of the switching element 103 is connected to the common reference terminal 106. Further, a gate of the switching element 103 is connected to a not-shown control device so that a gate signal SG101 is supplied thereto from the control device. The switching element 103 is turned on/off on the basis of the supplied gate signal SG101.

Operation of the DC/DC converter 100 is briefed below. At an initial stage, the input-side smoothing capacitor 102 is charged with an input voltage applied to the input terminal 107 in such a manner that a voltage between its two terminals (inter-terminal voltage) agrees with the input voltage. Once the switching element 103 is turned on, a current flows, on the basis of an electric charge accumulated in the input-side smoothing capacitor 102, to the ground via the coil 101 and switching element 103. During that time, the coil 101 is energized or excited and hence magnetic energy is accumulated in the coil 101. Once the switching element 103 is turned off, an induced voltage based on the magnetic energy accumulated in the coil 101 is convoluted with the voltage of the input-side smoothing capacitor 102, so that a voltage greater than the input voltage is produced and the thus-produced voltage supplies an output current Iout to the output-side smoothing capacitor 105 via the diode 104. Adjusting the ON/OFF duty cycle of the switching element 103 can provide a desired output voltage within a predetermined range. In this manner, a variable-voltage-boosting DC/DC converter can be provided.

However, in the conventional voltage-boosting DC/DC converter shown in FIG. 32, the coil 101 has to have a very great size and weight because the voltage boosting is effected by temporarily storing magnetic energy in the single coil 101. In addition, the voltage-boosting DC/DC converter would present the inconvenience that the operating efficiency lowers as the voltage boosting ratio is increased.

Further, in recent years, voltage-boosting DC/DC converters have been proposed which are designed to reduce a core loss and copper loss (see, for example, Wei Wen and Yim-Shu Lee, "A Two-Channel Interleaved Boost Converter with Reduced Core Loss and Copper Loss" exhibited in the 35th-year IEEE Power Electronics Special Conference, Jun. 22, 2004). These voltage-boosting DC/DC converters each employ an integrate magnet component to reduce the core loss and copper loss. The integrated magnet component comprises three inductors. Individual windings forming the three inductors are wound on a single core, and each of the inductors has small inductance and a small number of turns. The windings of two of the inductors are connected with each other and wound in opposite directions (i.e., interconnected in an "oppositely-wound configuration").

The fundamental voltage-boosting DC/DC converter of FIG. 32 employing the single coil 101 requires a great-size, great-weight core in order to achieve sufficient voltage boosting while preventing magnetic saturation of the coil 101. Such a great-size, great-weight core has been a significant hindrance to reduction in the overall size and weight of the DC/DC converter.

SUMMARY OF THE INVENTION

In view of the foregoing prior art problems, it is an object of the present invention to provide an improved DC/DC converter which permits reduction in size and weight of its inductor, and which can increase its voltage boosting ratio to two or more, can continuously vary the voltage boosting ratio and voltage lowering ratio within a range of one to N times.

According to a first aspect of the present invention, there is provided a voltage-boosting/lowering DC/DC converter including a low-voltage-side port and high-voltage-side port, which comprises: an inductor connected at one end to a positive-pole terminal of the low-voltage-side port; a transformer of a magnetic-field cancellation type including a primary winding and secondary winding connected with each other and wound in opposite winding directions (i.e., interconnected in an oppositely-wound configuration), a common terminal of the primary winding and secondary winding being connected to the other end of the inductor; a first switching element for controlling an energizing current of the primary winding which flows to a common reference terminal; a second switching element for controlling the energizing current of the primary winding which flows to a positive-pole terminal of the low-voltage-side port; a third switching element for controlling an energizing current of the secondary winding which flows to the common reference terminal; and a fourth switching element for controlling the energizing current of the secondary winding which flows to the positive-pole terminal of the low-voltage-side port.

Preferably, in the first-aspect DC/DC converter, a control device supplies ON/OFF control signals to the first switching element and the third switching element so as to control the respective ON/OFF action of the first and third switching elements in an alternate manner, to thereby perform voltage-boosting operation. Preferably, the duty cycle of each of the ON/OFF control signals is variable to provide a variable voltage-boosting ratio. Preferably, in the first-aspect DC/DC converter, the control device supplies ON/OFF control signals to the second switching element and the fourth switching element so as to control the respective ON/OFF action of the second and fourth switching elements in an alternate manner, to thereby perform voltage-lowering operation. Preferably, the duty cycle of each of the ON/OFF control signals is variable to provide a variable voltage-lowering ratio.

According to a second aspect of the present invention, there is provided a voltage-boosting/lowering DC/DC converter including a low-voltage-side port and high-voltage-side port, which comprises: an inductor connected at one end to a positive-pole terminal of the low-voltage-side port; a transformer of the magnetic-field-cancellation type including a primary winding and secondary winding interconnected in an oppositely-wound configuration, a common terminal of the primary and secondary windings being connected to the other end of the inductor: a first diode for connecting the other terminal of the primary winding of the transformer and a positive-pole terminal of the high-voltage-side port; a second diode for connecting the other terminal of the secondary winding of the transformer and the positive-pole terminal of the high-voltage-side port; a first switching element, connected between an intermediate tap of the primary winding and a common reference terminal, for controlling a current flowing from the intermediate tap of the primary winding to the common reference terminal; a second switching element, connected between the intermediate tap of the primary winding and the positive-pole terminal of the high-voltage-side port, for controlling a current flowing from the intermediate tap of the primary winding to the positive-pole terminal of the low-voltage-side port; a third switching element, connected between an intermediate tap of the secondary winding and the common reference terminal, for controlling a current flowing from the intermediate tap of the secondary winding to the common reference terminal; and a fourth switching element, connected between the intermediate tap of the secondary winding and the positive-pole terminal of the high-voltage-side port, for controlling a current flowing from the intermediate tap of the secondary winding to the positive-pole terminal of the low-voltage-side port.

Preferably, in the second-aspect DC/DC converter, a control device supplies ON/OFF control signals to the first switching element and the third switching element so as to control the respective ON/OFF action of the first and third switching elements in an alternate manner, to thereby perform voltage-boosting operation. Preferably, the duty cycle of each of the ON/OFF control signals is variable to provide a variable voltage-boosting ratio. Preferably, in the second-aspect DC/DC converter, the control device supplies ON/OFF control signals to the second switching element and the fourth switching element so as to control the respective ON/OFF action of the second and fourth switching elements in an alternate manner, to thereby perform voltage-lowering operation. Preferably, the duty cycle of each of the ON/OFF control signals is variable to provide a variable voltage-lowering ratio. Further, in the second-aspect DC/DC converter, the voltage-boosting ratio is preferably set depending on a winding ratio that is determined by a position of the intermediate tap of the primary winding.

According to a third aspect of the present invention, there is provided a voltage-boosting DC/DC converter including a low-voltage-side port and high-voltage-side port, which comprises: an inductor connected at one end to a positive-pole terminal of the low-voltage-side port; a transformer of the magnetic-field cancellation type including a primary winding and secondary winding interconnected in an oppositely-wound configuration, a common terminal of the primary winding and secondary winding being connected to the other end of the inductor; a first diode for connecting the other terminal of the primary winding of the transformer and a positive-pole terminal of the high-voltage-side port; a second diode for connecting the other terminal of the secondary winding of the transformer and the positive-pole terminal of the high-voltage-side port; a first switching element, connected between an intermediate tap of the primary winding and a common reference terminal, for controlling a current flowing from the intermediate tap of the primary winding to the common reference terminal; a third diode, connected between the intermediate tap of the primary winding and the positive-pole terminal of the high-voltage-side port, for directing a current from the intermediate tap of the primary winding to the positive-pole terminal of the high-voltage-side port; a second switching element, connected between an intermediate tap of the secondary winding and the common reference terminal, for controlling a current flowing from the intermediate tap of the secondary winding to the common reference terminal; and a fourth diode, connected between the intermediate tap of the secondary winding and the positive-pole terminal of the high-voltage-side port, for directing a current from the intermediate tap of the secondary winding to the positive-pole terminal of the high-voltage-side port.

Preferably, in the third-aspect DC/DC converter, a control device supplies ON/OFF control signals to the first switching element and the second switching element so as to control the respective ON/OFF action of the first and second switching elements in an alternate manner, to thereby perform voltage-boosting operation. Preferably, the duty cycle of each of the ON/OFF control signals is variable to provide a variable voltage-boosting ratio.

According to a fourth aspect of the present invention, there is provided a voltage-boosting/lowering DC/DC converter including a low-voltage-side port and high-voltage-side port, which comprises: a transformer of the magnetic-field cancellation type including a primary winding and secondary winding interconnected in an oppositely-wound configuration, a common terminal of the primary winding and secondary winding being connected to the other end of the inductor; a first diode for connecting the other terminal of the primary winding of the transformer and a positive-pole terminal of the high-voltage-side port; a second diode for connecting the other terminal of the secondary winding of the transformer and the positive-pole terminal of the high-voltage-side port; a first switching element, connected between an intermediate tap of the primary winding and a common reference terminal, for controlling a current flowing from the intermediate tap of the primary winding to the common reference terminal; a second switching element, connected between the intermediate tap of the primary winding and the positive-pole terminal of the high-voltage-side port, for controlling a current flowing from the intermediate tap of the primary winding to the positive-pole terminal of the low-voltage-side port; a third switching element, connected between the intermediate tap of the secondary winding and the common reference terminal, for controlling a current flowing from the intermediate tap of the secondary winding to the common reference terminal; and a fourth switching element, connected between the intermediate tap of the secondary winding and the positive-pole terminal of the high-voltage-side port, for controlling a current flowing from the intermediate tap of the secondary winding to the positive-pole terminal of the low-voltage-side port.

Preferably, in the fourth-aspect DC/DC converter, a control device supplies ON/OFF control signals to the first switching element and the third switching element so as to control the respective ON/OFF action of the first and third switching elements in an alternate manner, to thereby perform voltage-boosting operation. Preferably, the duty cycle of each of the ON/OFF control signals is variable to provide a variable voltage-boosting ratio. Preferably, in the fourth-aspect DC/DC converter, the control device supplies ON/OFF control signals to the second switching element and the fourth switching element so as to control the respective ON/OFF action of the second and fourth switching elements in an alternate manner, to thereby perform voltage-lowering operation. Preferably, the duty cycle of each of the ON/OFF control signals is variable to provide a variable voltage-lowering ratio. Further, in the fourth-aspect DC/DC converter, the voltage-boosting and voltage-lowering ratios are preferably set depending on a winding ratio that is determined by a position of the intermediate tap of the primary winding.

Further, preferably, in the fourth-aspect DC/DC converter, the other ends of the primary and secondary windings and the positive-pole terminal of the high-voltage-side port are interconnected by a bridge circuit in place of the first diode and the second diode, a negative-pole output terminal is provided in the high-voltage-side port, a capacitor is connected between the negative-pole output terminal and the common reference terminal, and one terminal in a high-voltage port of the bridge circuit is connected with the positive-pole terminal of the high-voltage-side port while the other terminal in the high-voltage port of the bridge circuit is connected with the negative-pole output terminal.

According to a fifth aspect of the present invention, there is provided a voltage-boosting DC/DC converter including a low-voltage-side port and high-voltage-side port, which comprises: a transformer of the magnetic-field cancellation type including a primary winding and secondary winding interconnected in an oppositely-wound configuration, a common terminal of the primary winding and secondary winding being connected to a positive-pole terminal of the low-voltage-side port; a first diode for connecting the other terminal of the primary winding of the transformer and a positive-pole terminal of the high-voltage-side port; a second diode for connecting the other terminal of the secondary winding of the transformer and the positive-pole terminal of the high-voltage-side port; a first switching element, connected between an intermediate tap of the primary winding and a common reference terminal, for controlling a current flowing from the intermediate tap of the primary winding to the common reference terminal; a third diode, connected between the intermediate tap of the primary winding and the positive-pole terminal of the high-voltage-side port, for directing the current from the intermediate tap of the primary winding to the positive-pole terminal of the high-voltage-side port; a second switching element, connected between an intermediate tap of the secondary winding and the common reference terminal, for controlling a current flowing from the intermediate tap of the secondary winding to the common reference terminal; and a fourth diode, connected between the intermediate tap of the secondary winding and the positive-pole terminal of the high-voltage-side port, for directing a current from the intermediate tap of the secondary winding to the positive-pole terminal of the high-voltage-side port.

Preferably, in the fifth-aspect DC/DC converter, a control device supplies ON/OFF control signals to the first switching element and the second switching element so as to control the respective ON/OFF action of the first and second switching elements in an alternate manner, to thereby perform voltage-boosting operation. Preferably, the duty cycle of each of the ON/OFF control signals is variable to provide a variable voltage-boosting ratio.

Further, preferably, in the fifth-aspect DC/DC converter, the other ends of the primary and secondary windings and the positive-pole terminal of the high-voltage-side port are interconnected by a bridge circuit in place of the first diode and the second diode, a negative-pole output terminal is provided in the high-voltage-side port, a capacitor is connected between the negative-pole output terminal and the common reference terminal, and one terminal in a high-voltage port of the bridge circuit is connected with the positive-pole terminal of the high-voltage-side port, and the other terminal in the high-voltage port of the bridge circuit is connected with the negative-pole output terminal.

Namely, the DC/DC converter according to the present invention is characterized by employing: a transformer including primary and secondary windings of an opposite-winding configuration; an inductor provided at a state preceding the transformer; and switching elements for controlling energization of the primary and secondary windings. The inductor may be dispensed with to simplify the construction of the DC/DC converter. Such arrangements can reduce the size and weight of the coil section and thereby reduce the overall size and weight of the DC/DC converter. Where the present invention is constructed as a voltage-boosting DC/DC converter, the voltage-boosting ratio can be varied continuously. Further, the present invention can also be constructed as a voltage-lowering DC/DC converter, in which case too the voltage-lowering ratio can be varied continuously. Further, in the case where the transformer employs an intermediate tap between the primary and secondary windings, there can be achieved other benefits than the afore-mentioned that the voltage-boosting ratio etc. can be increased to N times equal to or greater than two times and can be varied in a continuous manner.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Throughout the specification the term "exciting current" is used to represent an electric current supplied from an input power source to one winding connected with an ON-state switch (SW1 or SW3), while the term "excited current" is used to represent an electric current produced on the other winding connected with an OFF-state switch, by an induced electromotive force resulted from the exciting current flowing through the one winding.

Figure 1:
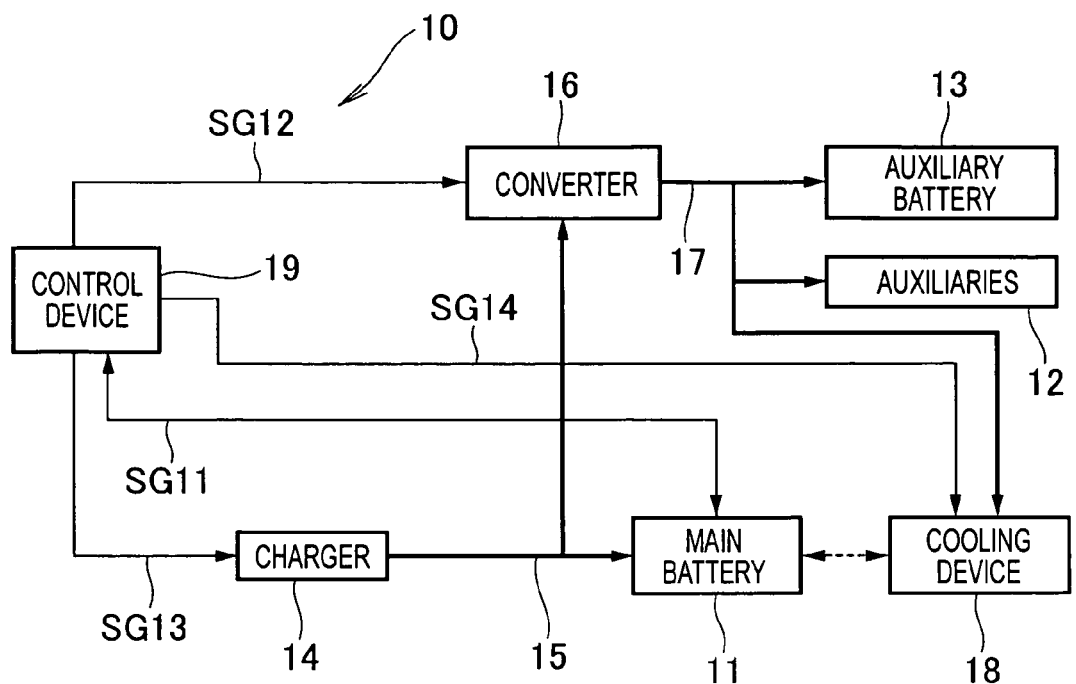
FIG. 1 is a block diagram showing an electric system of an electric vehicle to which is applied a DC/DC converter of the present invention.
Figure 2:
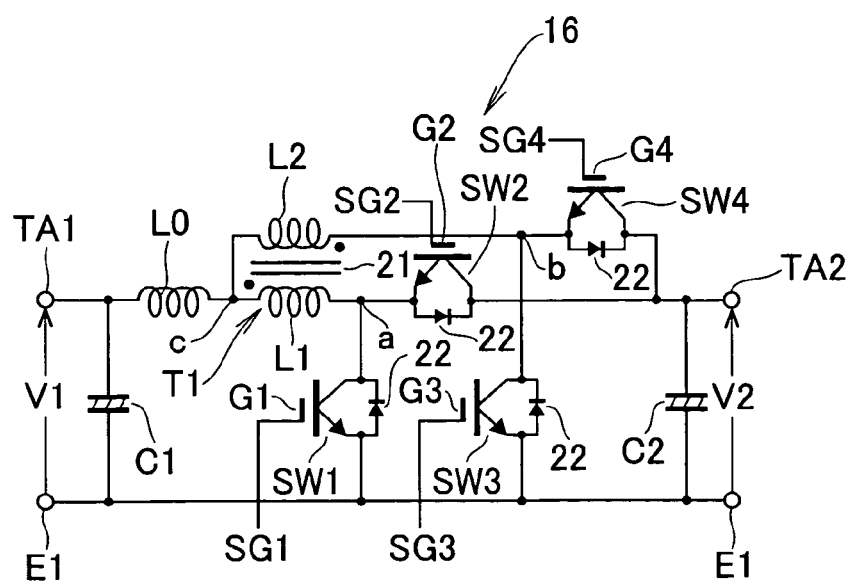
FIG. 2 is an electric circuit diagram showing a first embodiment of the DC/DC converter of the present invention.

With reference to FIGS. 1 and 2, a description will be made as to a first embodiment of a DC/DC converter according to the present invention. FIG. 1 is a block diagram showing an electric system of an electric vehicle to which is applied the first embodiment of the DC/DC converter, while FIG. 2 shows a detailed circuit construction of the first embodiment of the DC/DC converter.

In FIG. 1, the electric system 10 of the electric vehicle includes a main battery 11 for driving the vehicle to run (i.e., running battery), a battery 13 for driving auxiliaries 12 (i.e., auxiliary battery), and a charger 14 for charging the main battery 11 and auxiliary battery 13. The charger 14 is connected to the main battery 11 via a high-voltage line 15, to supply a high voltage (e.g., a few hundred volts). The charger 14 is also connected to the auxiliary battery 13 via the DC/DC converter 16 and low-voltage line 17. In the illustrated example of FIG. 1, the DC/DC converter 16 is used as a voltage-lowering DC/DC converter. The voltage-lowering-type DC/DC converter 16 converts a high voltage, supplied from the charger 14, into a low voltage and supplies electric power of the converted low voltage to the auxiliary battery 13 via the low-voltage line 17. The low voltage provided by the conversion via the DC/DC converter 16 is one of two predetermined voltage values, 14. 5 V and 13. 4 V, extensively used in gasoline automobiles. The electric power of the low voltage, output from the DC/DC converter 16, is also supplied to the auxiliaries 12, cooling device 18, etc. via the low-voltage line 17. The cooling device 18 comprises a cooling fan and water pump to cool the main battery 11 having increased in temperature.

The electric system 10 of the electric vehicle also includes a control device (ECU) 19. The control device 19 receives state detection signals from individual components included in the electric system 10 and outputs control signals to the individual components. More specifically, the control device 19 receives, from the main battery 11, signals SG11 pertaining to battery information (voltage, current, temperature, etc. of the battery 11), and then supplies control signals SG12 to the DC/DC converter 16, control signal SG13, indicative of a charge instruction, to the charger 14 and control signal SG14, indicative of an activation instruction, to the cooling device 18. The control signals SG12 include various control signals that are intended to set voltage boosting operation or voltage lowering operation of the DC/DC converter 16.

In the electric system 10 of the electric vehicle illustrated in FIG. 1, the DC/DC converter 16 is used as a voltage-lowering DC/DC converter, as noted above, although the DC/DC converter 16 may also be used as a voltage-boosting (or booster) DC/DC converter in accordance with its purpose or application. In the following description about the circuit construction and behavior of the DC/DC converter 16, the DC/DC converter 16 is assumed to be of a voltage-boosting and voltage-lowering type.

Next, the circuit construction of the DC/DC converter 16 is explained with reference to FIG. 2, in which the DC/DC converter 16 is shown as dual-port circuitry (four-terminal circuitry). In the case where the DC/DC converter should operate as a voltage-boosting DC/DC converter, the left-side port functions as a low-voltage-side input port, while the right-side port functions as a high-voltage-side output port. Conversely, in the case where the DC/DC converter should operate as a voltage-lowering DC/DC converter, the right-side port functions as a high-voltage-side input port, while the left-side port functions as a low-voltage-side output port.

As illustrated in FIG. 2, the DC/DC converter 16 includes a smoothing capacitor C1, an inductor (coil) L0, a transformer T1, four switching elements SW1, SW2, SW3 and SW4, and a smoothing capacitor C2. The smoothing capacitor C1 is connected between a common reference terminal (normally a ground terminal) E1 and a terminal TA1, and the smoothing capacitor C2 is connected between the common reference terminal E1 and a terminal TA2. When a DC voltage V1 has been input to the terminal TA1, a DC voltage V2 is output to the terminal TA2. The DC voltage V1 is lower than the DC voltage V2 (V1<V2). The terminals TA1 and TA2 are each a positive (plus)-pole terminal.

The transformer T1 includes a core (ferrite core, iron core or the like) 21, and primary and secondary windings L1 and L2. The primary and secondary windings L1 and L2 are connected with each other and wound in opposite winding directions (i.e., interconnected in an "oppositely-wound configuration"). Winding ratio between the primary winding L1 and the secondary winding L2 is preferably 1:1. In the figure, black dots added to the primary and secondary windings L1 and L2 each indicate a high-potential side of the corresponding winding L1 or L2 when a voltage has been induced therein. If the core 21 is a ferrite core, it is possible to appropriately deal with high frequencies and reduce the weight of the core section.

In the aforementioned transformer T1, the primary and secondary windings L1 and L2 are intercoupled magnetically via the core 21, and the winding ratio between the primary and secondary windings L1 and L2 is 1:1 as noted above. Thus, once an exciting current flows through one of the windings L1 and L2, a voltage is induced in the other winding, and this induced voltage has a level as in the one winding. For example, when the switching element SW1 has been turned on so that an electric current flows through the primary winding L1 on the basis of the input voltage V1, a voltage is induced in the primary winding L1 in accordance with variation in the current. As the current further flows through the primary winding L1, a voltage is also induced in the secondary winding L2 through the known mutual induction action. As a consequence, a voltage, corresponding to a sum of the input voltage V1, induced voltage of the inductor L0 and induced voltage of the secondary winding L2, is produced at the terminal TA2; in this manner, the DC/DC converter 16 performs voltage-boosting operation. Since the induced voltage of the inductor L0 and induced voltage of the secondary winding L2 each depend on an ON time of the switching element SW1, a sum of the induced voltage of the inductor L0 and induced voltage of the secondary winding L2 vary in value between V1 and 2V1. Operation similar to the afore-mentioned takes place when the switching element SW3 is turned on to energize the secondary winding L2 of the transformer T1.

The above-mentioned four switching elements SW1-SW4 are each in the form of, for example, an IGBT (Insulator Gate Bipolar Transistor) capable of conducting a high current and withstanding a high voltage. Each of the switching elements SW1-SW4 has a collector, emitter and base. Further, a diode 22 is connected in parallel between the collector and emitter of each of the switching elements in a forward direction from the emitter toward the collector.

The inductor L0 is connected at one terminal to the terminal TA1, i.e. terminal closer to the smoothing capacitor C1, and a common terminal c of the primary and secondary windings of the transformer T1 is connected to the other end of the inductor L0. Parallel-T circuitry is connected between the other end of the inductor L0 and the terminal TA2. The parallel-T circuitry comprises a first T circuit including the primary winding L1 of the transformer T1 and switching elements SW1 and SW2, and a second T circuit including the secondary winding L2 of the transformer T1 and switching elements SW3 and SW4.

In the first T circuit, a point between the collector and emitter of the switching element SW1 is connected between a terminal a of the primary winding L1 and the common reference terminal E1, and a point between the emitter and collector of the switching element SW2 is connected between the terminal a and the terminal TA2. Further, in the second T circuit, a point between the collector and emitter of the switching element SW3 is connected between a terminal b of the secondary winding L2 and the common reference terminal E1, and a point between the emitter and collector of the switching element SW4 is connected between the terminal b and the terminal TA2. Gate signals SG1, SG2, SG3 and SG4 for controlling ON/OFF action of the individual switching elements SW1-SW4 are supplied from the above-mentioned control device 19 to the respective gates G1, G2, G3 and G4 of the four switching elements SW1-SW4.

The following paragraphs describe behavior of the DC/DC converter 16. More specifically, the voltage-boosting operation of the DC/DC converter 16 is described with reference to FIGS. 3-8, and the voltage-lowering operation of the DC/DC converter 16 is described with reference to FIGS. 9-14.

Figure 3:
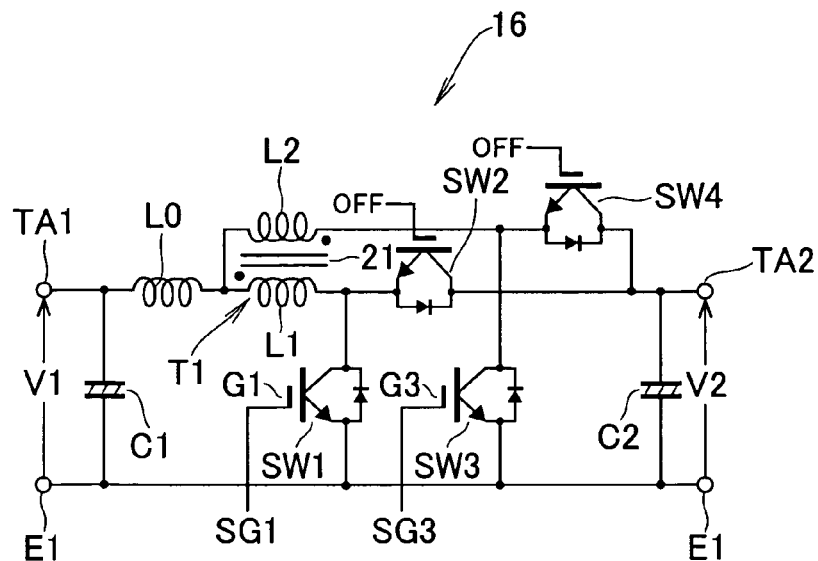
FIG. 3 is an electric circuit diagram of the first embodiment of the DC/DC converter when used as a voltage-boosting DC/DC converter.

First, the voltage-boosting operation of the DC/DC converter 16 is described with reference to FIGS. 3-8. As illustrated in FIG. 3, the above-mentioned gate signals SG1 and SG3 are given to the respective gates of the switching elements SW1 and SW3 to turn on/off the switching elements SW1 and SW3. When the input voltage is to be boosted, only OFF signals are always given to the respective gates of the switching elements SW2 and SW4 to constantly keep the switching elements SW2 and SW4 in the OFF state. In the voltage-boosting DC/DC converter 16, the DC voltage V1 is applied as an input voltage as illustrated in FIG. 3. In the voltage-boosting operation, the DC voltage V1 input to the left-side terminal TA1 is converted so that the DC voltage V2 of a level equal to or greater than the input DC voltage V1 is output from the right-side terminal TA2. In the DC/DC converter 16 as illustrated in FIG. 2, the voltage-boosting operation is performed in a forward direction from the left, low-voltage side toward the right, high-voltage side.

Figure 4:
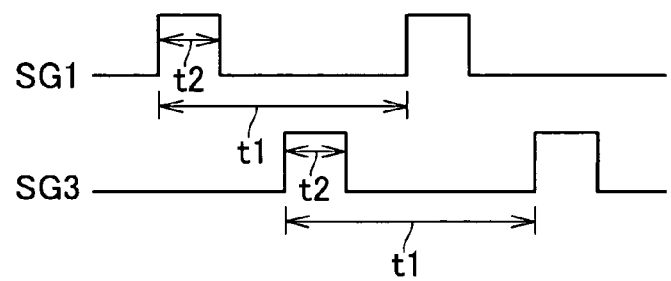
FIG. 4 is a waveform diagram of gate signals when the first embodiment of the DC/DC converter is used as a voltage-boosting DC/DC converter.

Signal waveforms of the gate signals SG1 and SG3 are shown in FIG. 4. The gate signals SG1 and SG3 are of pulse waveforms having the same period t1 and same duty cycle t2 and hence the same ON time, but these gate signals SG1 and SG3 are phase-shifted from each other so that the two signals SG1 and SG3 are not turned on simultaneously. The switching elements SW1 and SW3 alternately repeat ON/OFF action in response to such gate signals SG1 and SG3. The duty cycle t2, determining the ON time of the switching elements SW1 and SW3, is variable as necessary within a range not exceeding 50% so as to avoid the switching elements SW1 and SW3 from being turned on simultaneously. In this manner, the output voltage V2 can be increased or boosted from the level of the input voltage V1 within a range of one to two times the input voltage V1.

Figure 5:
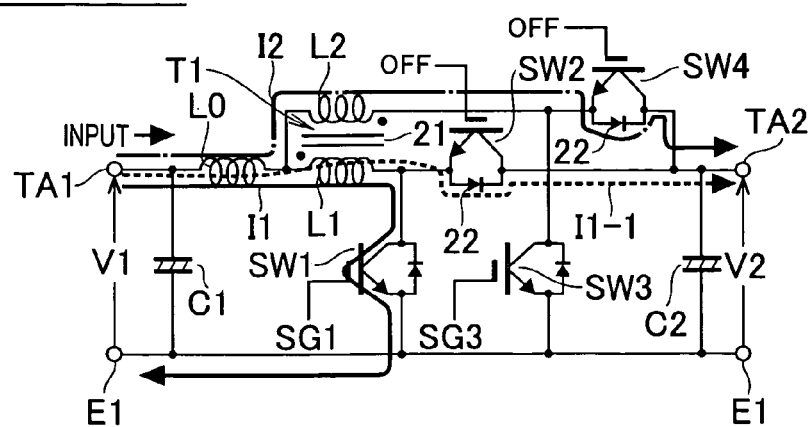
FIG. 5 is a diagram explanatory of a first example of voltage-boosting operation performed by the first embodiment of the DC/DC converter.
Figure 6:
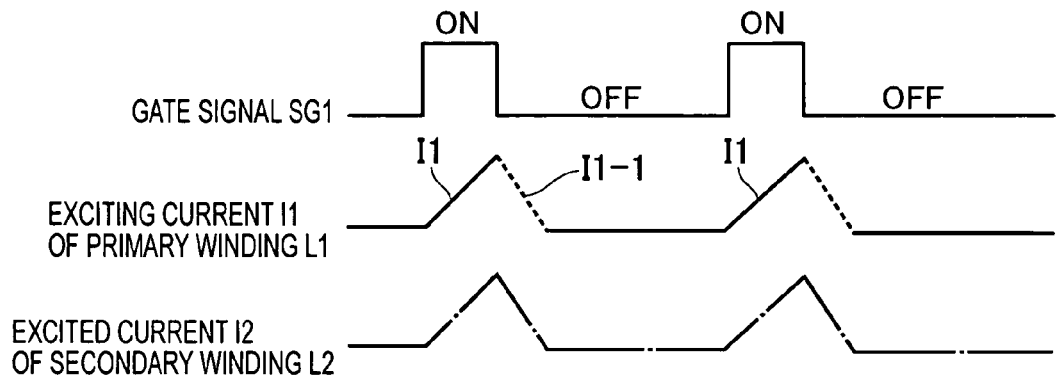
FIG. 6 is a diagram showing waveforms of a gate signal and energizing currents in the first example of voltage-boosting operation performed by the first embodiment of the DC/DC converter.
Figure 7:
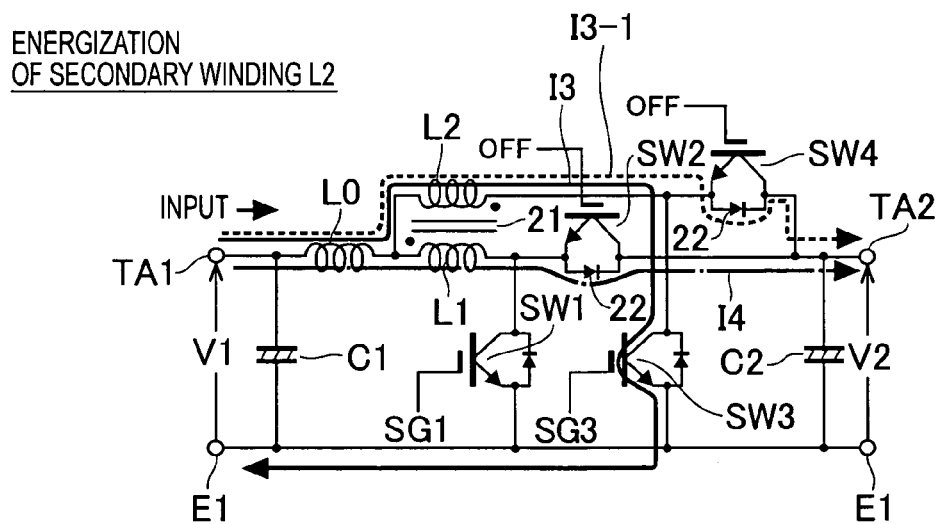
FIG. 7 is a diagram explanatory of a second example of voltage-boosting operation performed by the first embodiment of the DC/DC converter.

The voltage-boosting operation of the DC/DC converter 16 is described in greater with reference to FIGS. 5-8. FIG. 5 shows current flows in the individual circuit components of the DC/DC converter 16 when only the switching element SW1 is turned on to energize the primary winding L1 of the transformer T1. FIG. 7 shows current flows in the individual circuit components of the DC/DC converter when only the switching element SW3 is turned on to energize the secondary winding L2 of the transformer T1.

In the DC/DC converter 16 shown in FIG. 5, the gate signal SG1 is supplied to the gate of the switching element SW1 to turn on/off the switching element SW1. Because the DC voltage V1 has been input to the terminal TA1, an exciting current I1 flows through the primary winding L1 of the transformer T1 once the switching element SW1 is turned on. This exciting current I1 flows through a route of the terminal TA1, inductor L0, primary winding L1 and switching element SW1. While the gate signal SG1 is ON, the energizing current gradually increases in level. Once the gate signal SG1 turns into the OFF state, the exciting current I1 decreases in level and ultimately reaches a zero level. Broken-line portions I1-1 of the exciting current I1 shown in FIG. 6 represent current portions that flow as a result of discharge of energy accumulated in the inductor L0. The energizing current represented by the broken-line portion I1-1 decreases in level more slowly (i.e., taking a longer time) as the inductance of the inductor L0 is greater. This exciting current I1-1 flows, through the primary winding L1 and diode 22 of the switching element SW2, to the terminal TA2.

As the exciting current I1 flows through the primary winding L1 of the transformer T1 as set forth above, an excited current I2 is produced in the secondary winding L2 on the basis of the mutual induction action. The excited current I2 flows, through the diode 22 of the switching element SW4, to the terminal TA2. As shown in FIG. 6, the excited current I2 thus produced in the secondary winding L2 has variation characteristics substantially identical in shape to the exciting current I1 and also has similar level values to the exciting current I1 on the basis of the winding ratio (1:1). The smoothing capacitor C2 is charged with the excited current I2, as a result of which the DC voltage V2 is output to the terminal TA2 on the basis of the excited current I2.

Figure 8:
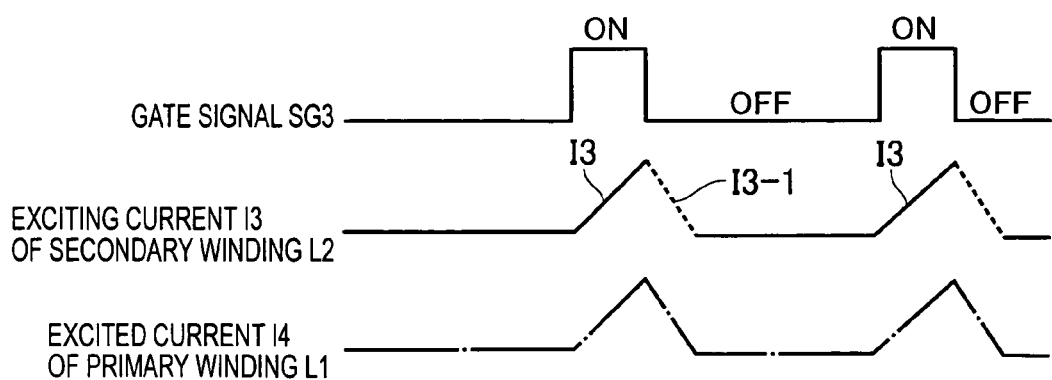
FIG. 8 is a diagram showing waveforms of a gate signal and energizing currents in the second example of voltage-boosting operation performed by the first embodiment of the DC/DC converter.

Referring now to FIG. 7, the gate signal SG3 is supplied to the gate of the switching element SW3 to turn on/off the switching element SW3. The switching element SW3 is kept in the ON state while the gate signal SG3 is ON as illustrated in FIG. 8. The DC voltage V1 has been input to the terminal TA1, and thus, an exciting current I3 flows through the secondary winding L2 of the transformer T1 once the switching element SW3 is turned on. This exciting current I3 flows through a route of the terminal TA1, inductor L0, secondary winding L2 and switching element SW3. While the gate signal SG3 is ON, the exciting current I3 gradually increases in level. Once the gate signal SG3 turns into the OFF state, the exciting current I3 decreases in level and ultimately reaches the zero level. Broken-line portions I3-1 of the exciting current I3 shown in FIG. 8 represent current portions that flow as a result of discharge of energy accumulated in the inductor L0. The exciting current represented by the broken-line portion I3-1 decreases in level more slowly (i.e., taking a longer time) as the inductance of the inductor L0 is greater. This exciting current flows, through the secondary winding L2 and diode 22 of the switching element SW4, to the terminal TA2.

As the exciting current I3 flows through the secondary winding L2 of the transformer T1 as set forth above, an excited current I4 is produced in the primary winding L1 on the basis of the mutual induction action. As shown in FIG. 8, the excited current I4 thus produced in the primary winding L1 has variation characteristics substantially identical in shape to the exciting current I3 and also has similar level values to the exciting current I3 on the basis of the winding ratio (1:1). The smoothing capacitor C2 is charged with the excited current I4, as a result of which the DC voltage V2 is output to the terminal TA2 on the basis of the excited current I4.

As set forth above, the voltage-boosting operation of the DC/DC converter 16 is based on the magnetic-field-cancellation type circuit section (L1, L2 and 21). Namely, once the switching element SW1 is turned on while the switching element SW3 is turned off, an exciting current flows through the primary winding L1, and simultaneously an excited current flows through the secondary winding L2 in such a direction as to cancel the magnetization of the core 21 and is then supplied to the output terminal TA2. Further, once the switching element SW3 is turned on while the switching element SW1 is turned off, an exciting current flows through the secondary winding L2, and simultaneously an excited current flows through the primary winding L1 in such a direction as to cancel the magnetization of the core 21 and is then supplied to the output terminal TA2. Thus, the those currents flow through the primary and secondary windings L1 and L2 in opposite directions, so that the DC magnetization in the core 21 is canceled out and thus the core 21 can be prevented from magnetically saturating easily. Thus, even with smaller windings (coils) than the conventional counterparts, the embodiment of the DC/DC converter 16 can appropriately handle greater electric power. Namely, the above-described inventive arrangements can achieve a significant reduction in size (i.e., minitualization) of the DC/DC converter 16.

Further, with the inductor L0 added between the terminal TA1 and the common terminal c of the primary and secondary windings L1 and L2, the boosting of the output voltage V2 from the input voltage V1 can be achieved as a sum of the induced voltage based on the inductor L0 and induced voltages by the primary and secondary windings L1 and L2 of the transformer T1. As a consequence, the DC/DC converter 16 can boost the input voltage V1 to a desired level within a range of one to two times the input voltage V1 by varying the duty cycle t2 of the gate signals SG1 and SG3 within a range not exceeding 50%.

Figure 9:
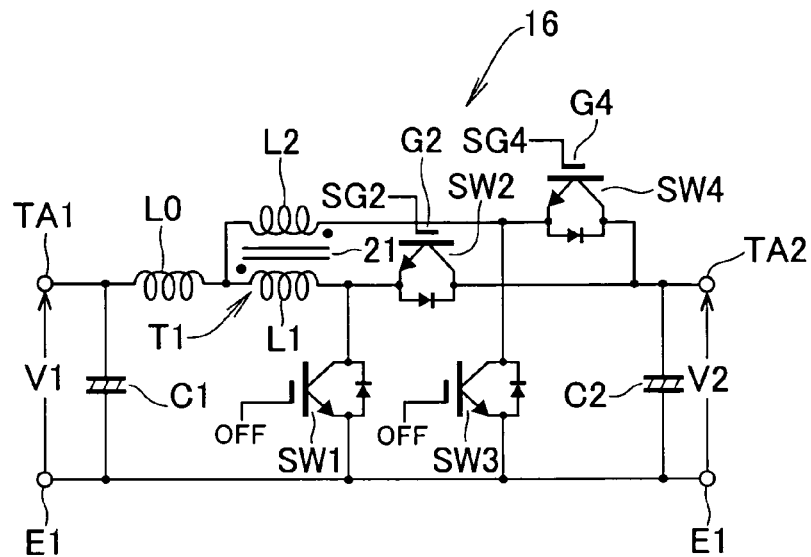
FIG. 9 is an electric circuit diagram of the first embodiment of the DC/DC converter when used as a voltage-lowering DC/DC converter.

Next, the voltage-lowering operation of the DC/DC converter 16 is described with reference to FIGS. 9-14. As illustrated in FIG. 9, the above-mentioned gate signals SG2 and SG4 are given to the respective gates of the switching elements SW2 and SW4 to turn on/off the switching elements SW2 and SW4. When the voltage is to be lowered, only OFF signals are always given to the respective gates of the switching elements SW1 and SW3 to constantly keep the switching elements SW1 and SW3 in the OFF state. In this voltage-lowering DC/DC converter 16, the DC voltage V2 is applied as an input voltage as illustrated in FIG. 9. In the voltage-lowering operation, the DC voltage V2 applied to the right-side terminal TA2 as the input voltage is converted so that the DC voltage V1 of a level equal to or lower than the input DC voltage V2 is output from the left-side terminal TA1. In the DC/DC converter 16, the voltage-lowering operation is performed in a reverse direction from the right, high-voltage side toward the left, low-voltage side.

Figure 10:
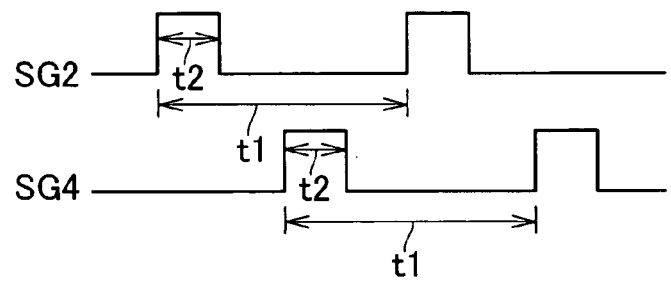
FIG. 10 is a waveform diagram of gate signals when the first embodiment of the DC/DC converter is used as a voltage-lowering DC/DC converter.

Signal waveforms of the gate signals SG2 and SG4 are shown in FIG. 10. The gate signals SG2 and SG4 are of pulse waveforms having the same period t1 and same duty cycle t2 and hence the same ON time, but these gate signals SG2 and SG4 are phase-shifted from each other so that the two signals SG2 and SG4 are not turned on simultaneously. The switching elements SW2 and SW4 alternately repeat ON/OFF action in response to such gate signals SG2 and SG4. The duty cycle t2, determining the ON time of the switching elements SW2 and SW4, is variable as necessary within a range not exceeding 50% so as to avoid the switching elements SW2 and SW4 from being turned on simultaneously. In this manner, the output voltage V1 can have a level lowered from the level of the input voltage V2 within a range of zero to 0.5 times the input voltage V2.

Figure 11:
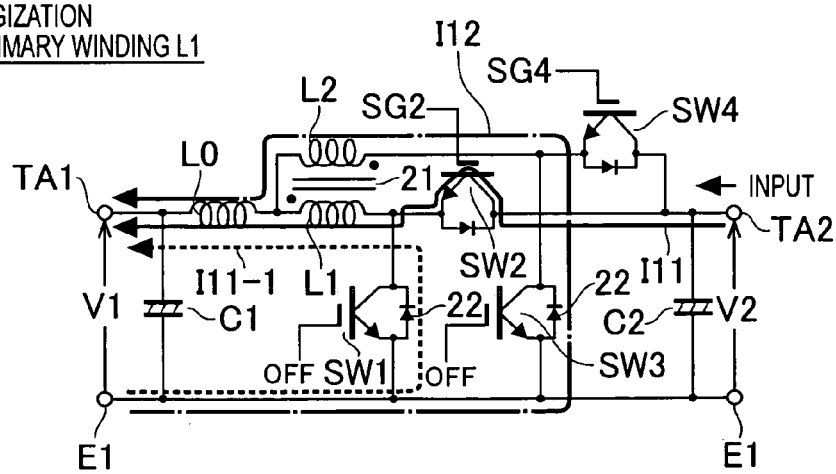
FIG. 11 is a diagram explanatory of a first example of voltage-lowering operation performed by the first embodiment of the DC/DC converter.
Figure 12:
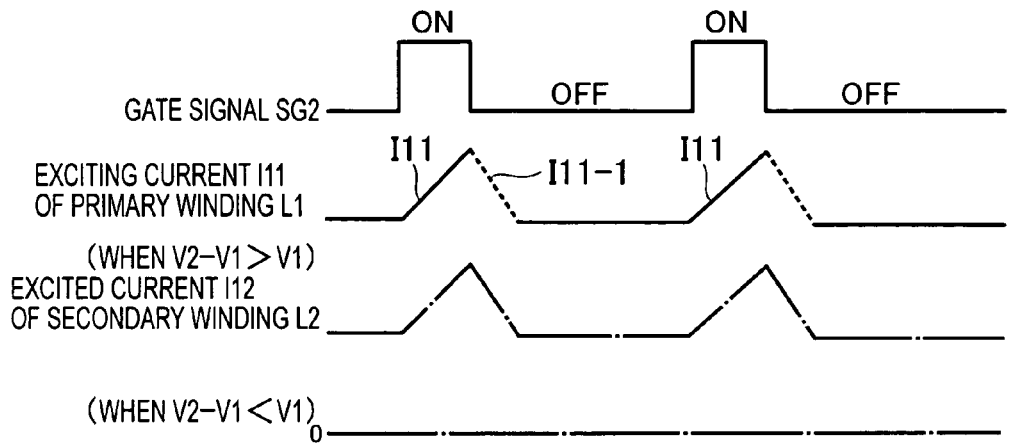
FIG. 12 is a diagram showing waveforms of a gate signal and energizing currents in the first example of voltage-lowering operation performed by the first embodiment of the DC/DC converter.
Figure 13:
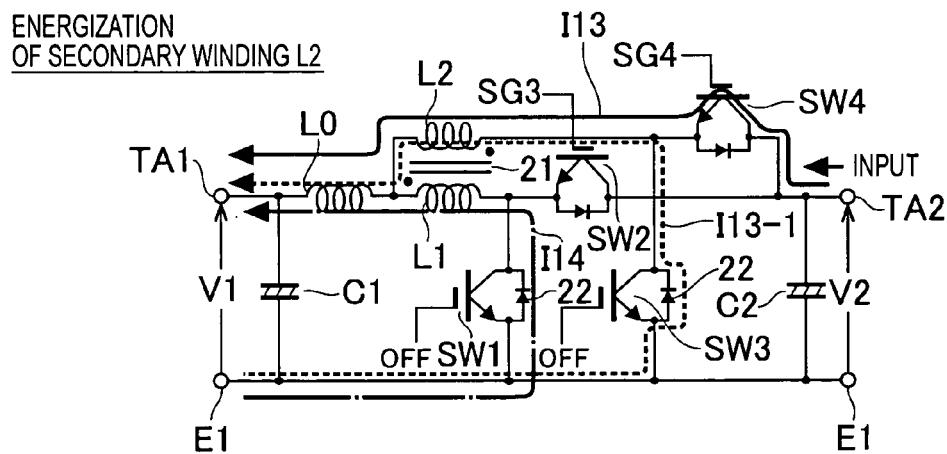
FIG. 13 is a diagram explanatory of a second example of voltage-lowering operation performed by the first embodiment of the DC/DC converter.

The voltage-lowering operation of the DC/DC converter 16 is described in greater with reference to FIGS. 11-14. FIG. 11 shows current flows in the individual circuit components of the DC/DC converter 16 when only the switching element SW2 is turned on to energize the primary winding L1 of the transformer T1. Further, FIG. 13 shows current flows in the individual circuit components of the DC/DC converter when only the switching element SW4 is turned on to energize the secondary winding L2 of the transformer T1.

In the DC/DC converter 16 shown in FIG. 11, the gate signal SG2 is supplied to the gate of the switching element SW2 to turn on/off the switching element SW2. The switching element SW2 is kept in the ON state while the gate signal SG2 is ON as illustrated in FIG. 12. Because the DC voltage V2 has been input to the terminal TA2, an exciting current I11 flows through the primary winding L1 of the transformer T1 once the switching element SW2 is turned on. This exciting current I11 flows through a route of the terminal TA2, switching element SW2, primary winding L1, inductor L0 and terminal TA1. While the gate signal SG2 is ON, the exciting current I11 gradually increases in level. Once the gate signal SG2 turns into the OFF state, the exciting current I11 decreases in level and ultimately reaches the zero level. Broken-line portions I11-1 of the exciting current I11 shown in FIG. 12 represent current portions that flow as a result of discharge of energy accumulated in the inductor L0. The exciting current represented by the broken-line portion I11-1 decreases in level more slowly (i.e., taking a longer time) as the inductance of the inductor L0 is greater. This exciting current flows, through the diode 22 of the switching element SW1, primary winding L1 and inductor L0, to the terminal TA1.

As the exciting current I11 flows through the primary winding L1 of the transformer T1 as set forth above, an excited current I12 is produced in the secondary winding L2 on the basis of the mutual induction action as long as V2−V1>V1, but no excited current is produced in the secondary winding L2 if V2−V1<V1. The excited current I12 flows, through the diode 22 of the switching element SW3, to the terminal TA1. As shown in FIG. 12, the excited current I12 thus produced in the secondary winding L2 has variation characteristics substantially identical in shape to the exciting current I1 and also has similar level values to the exciting current I1 on the basis of the winding ratio (1:1). The smoothing capacitor C1 is charged with the excited current I12, as a result of which the DC voltage V1 is output to the terminal TA1 on the basis of the excited current I12.

Figure 14:
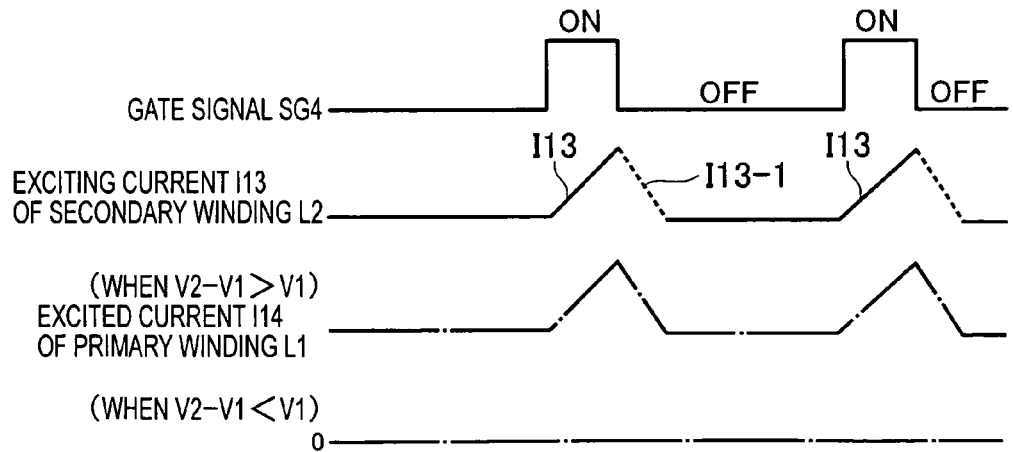
FIG. 14 is a diagram showing waveforms of a gate signal and energizing currents in the second example of voltage-lowering operation performed by the first embodiment of the DC/DC converter.

Referring now to FIG. 13, the gate signal SG4 is supplied to the gate of the switching element SW4 to turn on/off the switching element SW4. As illustrated in FIG. 14, the switching element SW4 is kept in the ON state while the gate signal SG4 is ON as illustrated in FIG. 14. The DC voltage V2 has been input to the terminal TA2, and thus, an exciting current I13 flows through the secondary winding L2 of the transformer T1 once the switching element SW4 is turned on. This exciting current I13 flows through a route of the terminal TA2, switching element SW4, secondary winding L2 and inductor L0. While the gate signal SG4 is ON, the exciting current I13 gradually increases in level. Once the gate signal SG4 turns into the OFF state, the exciting current I13 decreases in level and ultimately reaches the zero level. Broken-line portions I13-1 of the exciting current I13 shown in FIG. 14 represent current portions that flow as a result of discharge of energy accumulated in the inductor L0. The exciting current represented by the broken-line portion I13-1 decreases in level more slowly (i.e., taking a longer time) as the inductance of the inductor L0 is greater. This exciting current flows, through the diode 22 of the switching element SW3, secondary winding L2 and inductor L0, to the terminal TA1.

As the exciting current I13 flows through the secondary winding L2 of the transformer T1 as set forth above, an excited current I14 is produced in the primary winding L1 on the basis of the mutual induction action as long as V2−V1>V1, but no excited current is produced in the primary winding L1 if V2−V1<V1. As shown in FIG. 14, the excited current I14 thus produced in the produced winding L1 has variation characteristics substantially identical in shape to the exciting current I13 and also has similar level values to the exciting current I13 on the basis of the winding ratio (1:1). The smoothing capacitor C1 is charged with the excited current I14, as a result of which the DC voltage V1 is output to the terminal TA1 on the basis of the excited current I14.

As set forth above, the voltage-lowering operation of the DC/DC converter 16 is based on the magnetic-field-cancellation type circuit section (L1, L2 and 21). Namely, once the switching element SW2 is turned on while the switching element SW4 is turned off, an exciting current flows through the primary winding L1, and simultaneously an excited current flows through the secondary winding L2 in such a direction as to cancel the magnetization of the core 21 and the current (magnetic energy) is then supplied through the secondary winding L2 to the output terminal TA1. Further, once the switching element SW4 is turned on while the switching element SW2 is turned off, an exciting current flows through the secondary winding L2, and simultaneously an excited circuit flows through the primary winding L1 in such a direction as to cancel the magnetization of the core 21 and is then supplied to the output terminal TA1. Thus, the two currents flow through the primary and secondary windings L1 and L2 in opposite directions, so that the DC magnetization in the core 21 is canceled out and thus the core 21 can be prevented from magnetically saturating easily. Thus, even with smaller windings (coils) than the conventional counterparts, the embodiment of the DC/DC converter 16 can appropriately handle greater electric power. Namely, the above-described inventive arrangements can achieve a significant reduction in size (i.e., minituatization) of the DC/DC converter 16.

Further, with the inductor L0 added between the terminal TA1 and the common terminal c of the primary and secondary windings L1 and L2, the lowering of the output voltage V1 from the input voltage V2 can be achieved as a sum of the induced voltage based on the inductor L0 and induced voltages by the primary and secondary windings L1 and L2 of the transformer T1. As a consequence, the DC/DC converter 16 can lower the input voltage V2 to a desired level within a range of zero to 0.5 times the input voltage V2 by varying the duty cycle t2 of the gate signals SG2 and SG4 within a range not exceeding 50%.

Next, with reference to FIGS. 15 to 20, a description will be given about a second embodiment of the DC/DC converter according to the present invention. In FIGS. 15 to 20, the same elements as in the first embodiment described above in relation to FIG. 2 etc. are indicated by the same reference numerals and will not be described to avoid unnecessary duplication.

The second embodiment of the DC/DC converter 31 too is constructed to perform voltage-boosting and voltage-lowering operation. The voltage-boosting operation of the DC/DC converter 31 is described with reference to FIGS. 17 and 18, and the voltage-lowering operation of the converter 31 is described with reference to FIGS. 19-20. Waveforms of various currents flowing in the individual circuit components are described using FIGS. 4, 6, 8, 10, 12 and 14 having been used in the above description of the first embodiment.

Figure 15:
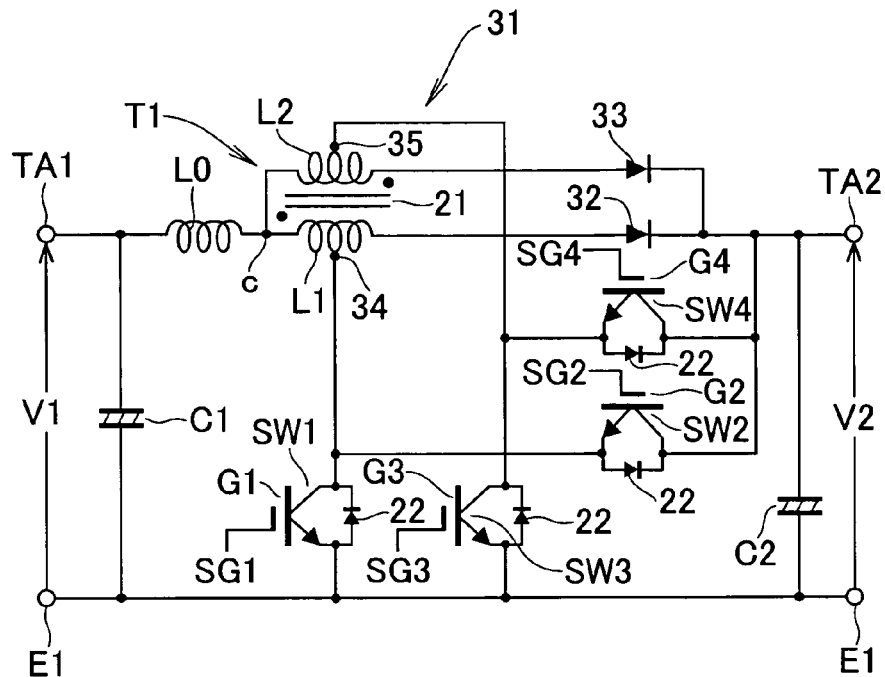
FIG. 15 is an electric circuit diagram showing a second embodiment of the DC/DC converter of the present invention.
Figure 16:
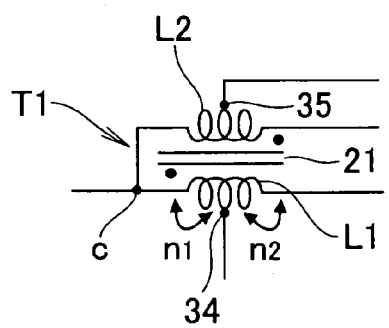
FIG. 16 is a diagram explanatory of a winding ratio based on an intermediate tap in a transformer of the second embodiment of the DC/DC converter.

First, a circuit construction of the DC/DC converter 31 is described with reference to FIGS. 15 and 16, in which the DC/DC converter 31 is shown as dual-port circuitry (four-terminal circuitry). In the case where the converter 31 should operate as the voltage-boosting DC/DC converter, the left-side port functions as a low-voltage-side input port, while the right-side port functions as a high-voltage-side output port. Conversely, in the case where the converter 31 should operate as the voltage-lowering DC/DC converter, the right-side port functions as a high-voltage-side input port, while the left-side port functions as a low-voltage-side output port.

Similarly to the first embodiment, the DC/DC converter 31 includes a smoothing capacitor C1, an inductor (coil) L0, a transformer T1, four switching elements SW1, SW2, SW3 and SW4 and a smoothing capacitor C2. The DC/DC converter 31 also includes two diodes 32 and 33. DC voltage V1 is input to a positive-pole terminal TA1 of the low-voltage-side input port, and a DC voltage V2 is output from a positive-pole terminal TA2 of the high-voltage-side output port. Reference character E1 represents a common reference terminal (ground terminal).

The transformer T1 includes a core 21, and primary and secondary windings L1 and L2. The primary and secondary windings L1 and L2 are connected with each other and wound in opposite winding directions (i.e., interconnected in an "oppositely-wound configuration"). Winding ratio between the primary winding L1 and the secondary winding L2 is preferably 1:1. In the second embodiment, the primary and secondary windings L1 and L2 include intermediate taps 34 and 35, respectively. As shown in FIG. 16, the intermediate tap 34 divides the primary winding L1 with a winding ratio of $n_1:n_2$. With the winding ratio of $n_1:n_2$, a voltage-boosting ratio N of the voltage-boosting DC/DC converter 31 can be determined by $$N=(n_1+n_2)/n_1+1$$

The winding division ratio is determined in accordance with voltage-boosting/lowering requirements of a system to which is applied the present invention.

In the DC/DC converter 31, the inductor L0 is connected at one terminal to the terminal TA1, and a common terminal c of the primary and secondary windings L1 and L2 of the transformer T1 is connected to the other end of the inductor L0. Further, in the DC/DC converter 31, the diode 32 is connected between the other end of the primary winding L1 of the transformer T1 and the terminal TA2, and the diode 33 is connected between the other end of the secondary winding L2 of the transformer T1 and the terminal TA2.

Further, in the transformer T1, a point between the collector and emitter of the switching element SW1 is connected between the intermediate tap 34 of the primary winding L1 and the common reference terminal E1, and a point between the emitter and collector of the switching element SW2 is connected between the intermediate tap 34 and the terminal TA2. Point between the collector and emitter of the switching element SW3 is connected between the intermediate tap 35 of the secondary winding L2 and the common reference terminal E1, and a point between the emitter and collector of the switching element SW4 is connected between the intermediate tap 35 and the terminal TA2. Gate signals SG1-SG4 for controlling ON/OFF states of the individual switching elements SW1-SW4 are supplied from the above-mentioned control device 19 to the respective gates G1-G4 of the switching elements SW1-SW4. Further, a diode 22 is connected in parallel between the collector and emitter of each of the switching elements SW1-SW4 in a forward direction from the emitter toward the collector.

In the second embodiment, characteristics and operation of the transformer T1, primary and secondary winding L1 and L2 of the transformer T1 and switching elements SW1-SW4, and waveform characteristics of the switching elements SW1-SW4 are the same as in the first embodiment.

Figure 17:
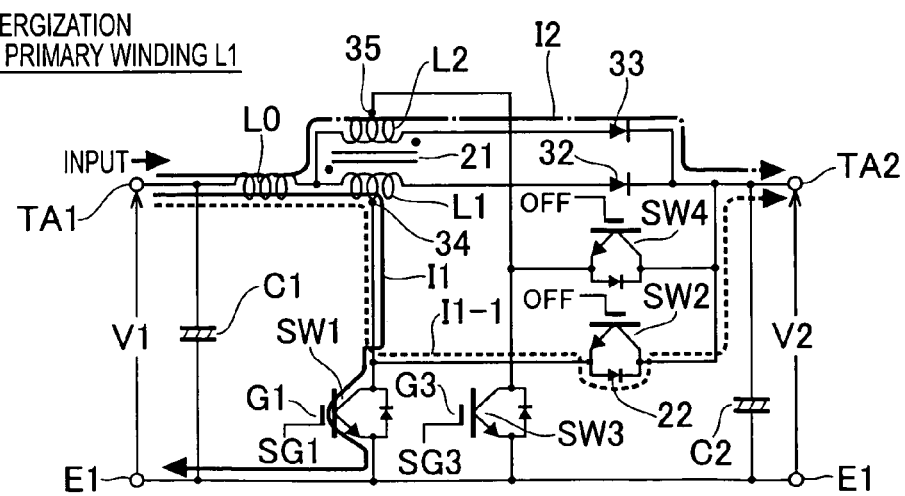
FIG. 17 is a diagram explanatory of a first example of voltage-boosting operation performed by the second embodiment of the DC/DC converter.

The voltage-boosting operation of the DC/DC converter 31 is described with reference to FIGS. 17 and 18. In the voltage-boosting operation, the above-mentioned gate signals SG1 and SG3 are given to the respective gates of the switching elements SW1 and SW3, and an OFF signal is given to the gate of each of the switching elements SW2 and SW4. FIG. 17 shows current flows in the individual circuit components of the DC/DC converter when only the switching element SW1 is turned on, by the gate signal SG1, to energize the primary winding L1 of the transformer T1; during that time, the switching element SW3 is kept in the OFF state in accordance with the gate signal SG3. Further, FIG. 18 shows current flows in the individual circuit components of the DC/DC converter when only the switching element SW3 is turned on, by the gate signal SG3, to energize the secondary winding L2 of the transformer T1; during that time, the switching element SW1 is kept in the OFF state in accordance with the gate signal SG1.

In the DC/DC converter 31 shown in FIG. 17, the gate signal SG1 is supplied to the gate of the switching element SW1; the switching element SW1 is turned on when the gate signal SG1 is ON. Because the DC voltage V1 has been input to the terminal TA1, an exciting current I1 flows through the primary winding L1 of the transformer T1 via the intermediate tap 34 once the switching element SW1 is turned on. This exciting current I1 flows through a route of the terminal TA1, inductor L0, primary winding L1 and switching element SW1. While the gate signal SG1 is ON, the exciting current I1 gradually increases in level. Once the gate signal SG1 turns into the OFF state, the exciting current I1 decreases in level and ultimately reaches the zero level. Exciting current I1-1, produced for a predetermined time immediately following the turning-off of the gate signal SG1, flows, through the primary winding L1, intermediate tap 34, and diode 22 of the switching element SW2, to the terminal TA2.

As the exciting current I1 flows through the primary winding L1 of the transformer T1, an excited current I2 is produced in the secondary winding L2 on the basis of the mutual induction action. The excited current I2 flows, through the diode 33, to the terminal TA2. The excited current I2 thus produced in the secondary winding L2 has variation characteristics substantially identical in shape to the exciting current I1 and also has similar level values to the exciting current I1 on the basis of the winding ratio (1:1). The smoothing capacitor C2 is charged with the excited current I2, as a result of which the DC voltage V2 is output to the terminal TA2 on the basis of the excited current I2.

Figure 18:
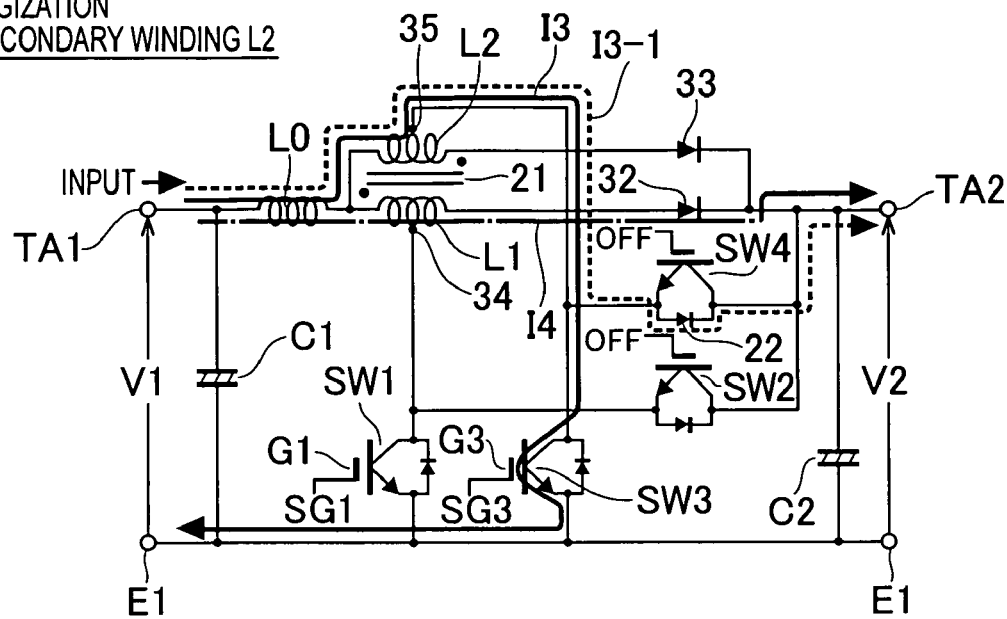
FIG. 18 is a diagram explanatory of a second example of voltage-boosting operation performed by the second embodiment of the DC/DC converter.

Referring now to FIG. 18, the gate signal SG3 is supplied to the gate of the switching element SW3 in the DC/DC converter 31; the switching element SW3 is turned on when the gate signal SG3 is ON. The DC voltage V1 has been input to the terminal TA1, and thus, an exciting current I3 flows through the secondary winding L2 of the transformer T1 once the switching element SW3 is turned on. This exciting current I3 flows through a route of the terminal TA1, inductor L0, secondary winding L2, intermediate tap 35 and switching element SW3. While the gate signal SG3 is ON, the exciting current I3 gradually increases in level. Once the gate signal SG3 turns into the OFF state, the exciting current I3 decreases in level and ultimately reaches the zero level. Exciting current I3-1, produced for a predetermined time immediately following the turning-off of the gate signal SG3, flows to the terminal TA2 through the secondary winding L2, inter-mediate tap 35 and diode 22 of the switching element SW4.

As the exciting current I3 flows through the secondary winding L2 of the transformer T1, an excited current I4 is produced in the primary winding L1 on the basis of the mutual induction action. The excited current I4 thus produced in the primary winding L1 has variation characteristics substantially identical in shape to the exciting current I3 and also has similar level values to the exciting current I3 on the basis of the winding ratio (1:1). The smoothing capacitor C2 is charged with the excited current I4, as a result of which the DC voltage V2 is output to the terminal TA2 on the basis of the excited current I4.

According to the above-described voltage-boosting operation of the DC/DC converter 31, once the switching element SW1 is turned on while the switching element SW3 is turned off, an exciting current flows through the primary winding L1, and simultaneously an excited current flows through the secondary winding in such a direction as to cancel the magnetization of the core 21 and the current (magnetic energy) is then supplied to the output terminal TA2. Further, once the switching element SW3 is turned on while the switching element SW1 is turned off, an exciting current flows through the secondary winding L2, and simultaneously an excited current flows through the primary winding L1 in such a direction as to cancel the magnetization of the core 21 and the current (magnetic energy) is then supplied, through the primary winding L1, to the output terminal TA2. Thus, those currents flow through the primary and secondary windings L1 and L2 of the transformer T1 in opposite directions, so that the DC magnetization in the core 21 is canceled out and thus the core 21 can be prevented from magnetically saturating easily. Thus, even with smaller windings (coils) than the conventional counterparts, the DC/DC converter 31 can appropriately handle greater electric power. Namely, the above-described inventive arrangements can achieve a significant reduction in size (i.e., minitualization) of the DC/DC converter 31.

Further, with the inductor L0 added between the terminal TA1 and the common terminal c of the primary and secondary windings L1 and L2, the boosting of the output voltage V2 from the input voltage V1 can be achieved as a sum of the induced voltage based on the inductor L0 and induced voltages by the primary and secondary windings L1 and L2 of the transformer T1. As a consequence, the DC/DC converter 31 can boost the input voltage V1 to a desired level within a range of zero to N times of the input voltage V1 by varying the duty cycle t2 of the gate signals SG1 and SG3 within a range not exceeding 50%.

Figure 19:
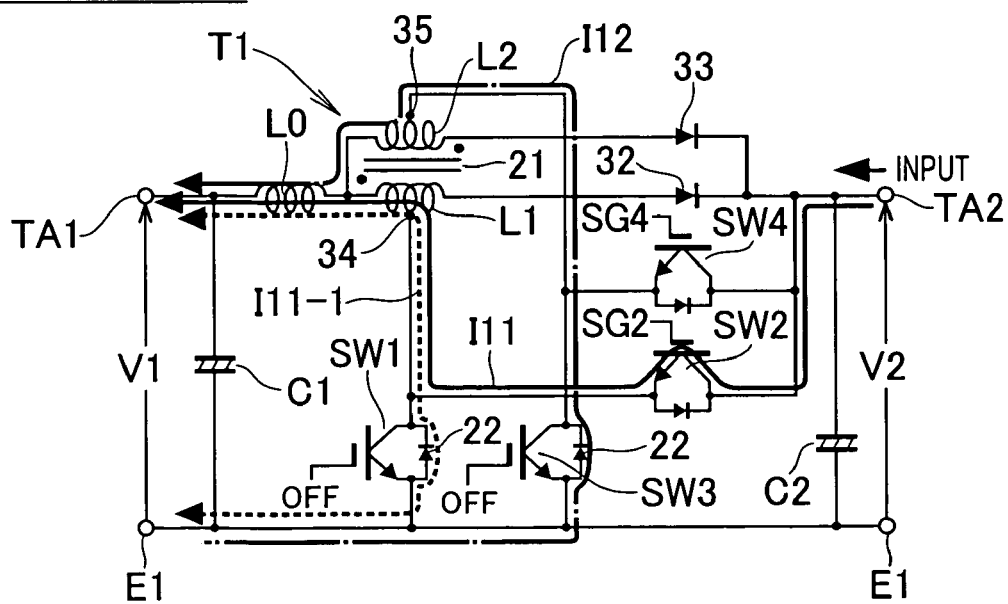
FIG. 19 is a diagram explanatory of a first example of voltage-lowering operation performed by the second embodiment of the DC/DC converter.
Figure 20:
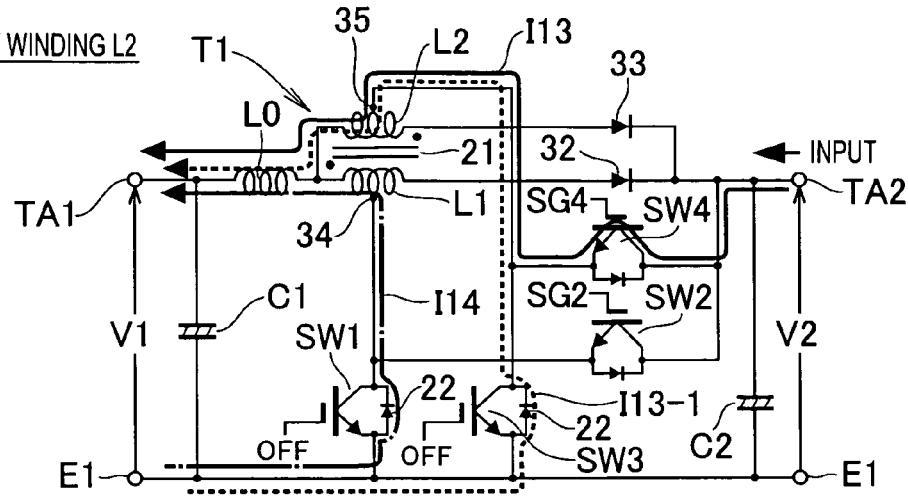
FIG. 20 is a diagram explanatory of a second example of voltage-lowering operation performed by the second embodiment of the DC/DC converter.

Next, the voltage-lowering operation of the DC/DC converter 31 is described with reference to FIGS. 19 and 20. The above-mentioned gate signals SG2 and SG4 are given to the respective gates of the switching elements SW2 and SW4, while OFF signals are given to the switching elements SW1 and SW3. FIG. 19 shows current flows in the individual circuit components of the DC/DC converter when only the switching element SW2 is turned on to energize the primary winding L1 of the transformer T1. At that time, the switching element SW4 is kept in the OFF state by the gate signal SG4. Further, FIG. 20 shows current flows in the individual circuit components of the DC/DC converter when only the switching element SW4 is turned on to energize the secondary winding L2 of the transformer T1. At that time, the switching element SW2 is kept in the OFF state by the gate signal SG2.

In the DC/DC converter 31 shown in FIG. 19, the gate signal SG2 is supplied to the gate of the switching element SW2 to turn on/off the switching element SW2. The switching element SW2 is kept in the ON state while the gate signal SG2 is ON. Because the DC voltage V2 has been input to the terminal TA2, an exciting current I11 flows through the primary winding L1 of the transformer T1 once the switching element SW2 is turned on. This exciting current I11 flows through a route of the terminal TA2, switching element SW2, intermediate tap 34, primary winding L1, inductor L0 and terminal TA1. While the gate signal SG2 is ON, the exciting current I11 gradually increases in level. Once the gate signal SG2 turns into the OFF state, the exciting current I11 decreases in level and ultimately reaches the zero level. Exciting current I11-1, produced for a predetermined time immediately following the turning-off of the gate signal SG2, flows to the terminal TA1 through the diode 22 of the switching element SW1, primary winding L1 and inductor L0.

As the exciting current I11 flows through the primary winding L1 of the transformer T1 as set forth above, an excited current I12 is produced in the secondary winding L2 on the basis of the mutual induction action as long as V2−V1>V1, but no excited current is produced in the secondary winding L2 if V2−V1<V1. The excited current I12 flows, through the diode 22 of the switching element SW3, to the terminal TA1. The excited current I12 thus produced in the secondary winding L2 has variation characteristics substantially identical in shape to the exciting current I11 and also has similar level values to the exciting current I1 on the basis of the winding ratio (1:1). The smoothing capacitor C1 is charged with the excited current I12, as a result of which the DC voltage V1 is output to the terminal TA1 on the basis of the excited current I12.

Referring now to FIG. 20, the gate signal SG4 is supplied to the gate of the switching element SW4 to turn on/off the switching element SW4 in the DC/DC converter 31. The switching element SW4 is kept in the ON state while the gate signal SG4 is ON. The DC voltage V2 has been input to the terminal TA2, and thus, an exciting current I13 flows through the secondary winding L2 of the transformer T1 once the switching element SW4 is turned on. This exciting current I13 flows through a route of the terminal TA2, switching element SW4, intermediate tap 35, secondary winding L2 and inductor L0. While the gate signal SG4 is ON, the exciting current I13 gradually increases in level. Once the gate signal SG4 turns into the OFF state, the exciting current I13 decreases in level and ultimately reaches the zero level. Exciting current I13-1, produced for a predetermined time immediately following the turning-off of the gate signal SG4, flows to the terminal TA1 through the diode 22 of the switching element SW3, secondary winding L2 and inductor L0.

As the exciting current I13 flows through the secondary winding L2 of the transformer T1 as set forth above, an excited current I14 is produced in the primary winding L1 on the basis of the mutual induction action as long as V2−V1>V1, but no excited current is produced in the primary winding L1 if V2−V1<V1. The excited current I14 thus produced in the produced winding L1 has variation characteristics substantially identical in shape to the exciting current I13 and also has similar level values to the exciting current I13 on the basis of the winding ratio (1:1). The smoothing capacitor C1 is charged with the excited current I14, as a result of which the DC voltage V1 is output to the terminal TA1 on the basis of the excited current I14.

Namely, the voltage-lowering operation of the DC/DC converter 31 is carried out as follows. Once the switching element SW2 is turned on while the switching element SW4 is turned off, an exciting current flows through the primary winding L1, and simultaneously an excited current flows through the secondary winding L2 in such a direction as to cancel the magnetization of the core 21 and the current (magnetic energy) is then supplied through the secondary winding L2 to the output terminal TA1. Further, once the switching element SW4 is turned on while the switching element SW2 is turned off, an exciting current flows through the secondary winding L2, and simultaneously an excited current flows through the primary winding L1 in such a direction as to cancel the magnetization of the core 21, and the current (magnetic energy) is then supplied to the output terminal TA1 through the primary winding L1. Thus, those currents flow through the primary and secondary windings L1 and L2 in opposite directions, so that the DC magnetization in the core 21 is canceled out and thus the core 21 can be prevented from magnetically saturating easily. Thus, even with smaller windings (coils) than the conventional counterparts, the DC/DC converter 31 can appropriately handle greater electric power. Namely, the above-described inventive arrangements can achieve a significant reduction in size (i.e., minitualization) of the DC/DC converter 31.

Further, with the inductor L0 added between the terminal TA1 and the common terminal c of the primary and secondary windings L1 and L2, the lowering of the output voltage V1 from the input voltage V2 can be achieved as a sum of the induced voltage based on the inductor L0 and induced voltages by the primary and secondary windings L1 and L2 of the transformer T1. As a consequence, the DC/DC converter 31 can lower the input voltage V2 to a desired level within a range of zero to 1/N times of the input voltage V2 by varying the duty cycle t2 of the gate signals SG2 and SG4 within a range not exceeding 50%.

Figure 21:
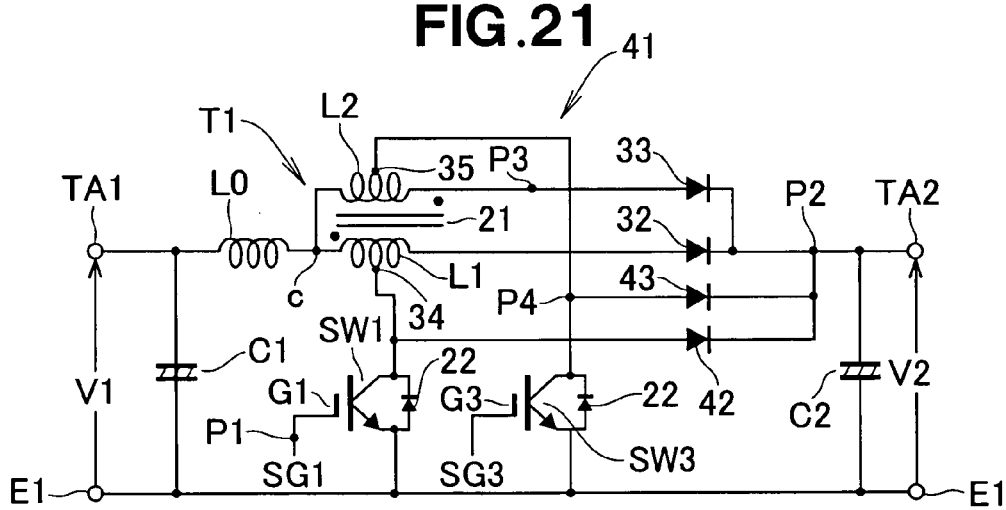
FIG. 21 is an electric circuit diagram showing a third embodiment of the DC/DC converter of the present invention.
Figure 22:
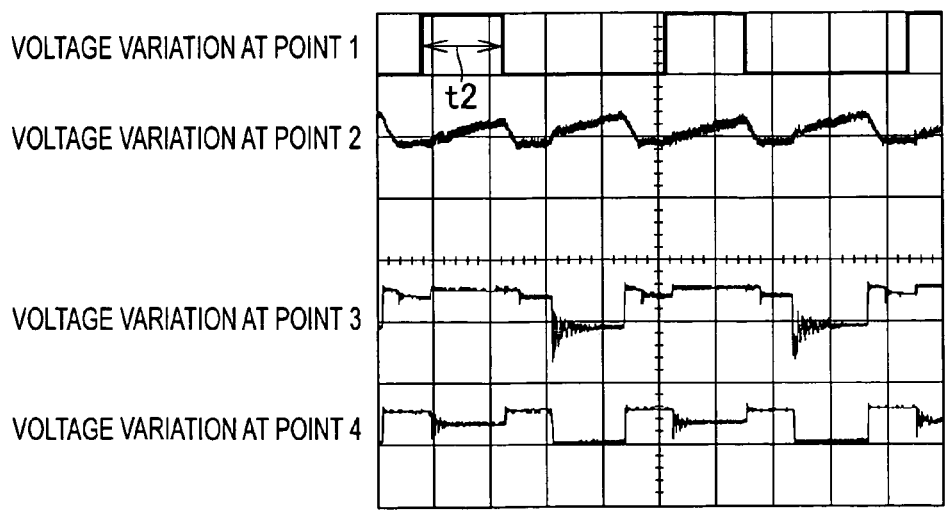
FIG. 22 is a waveform diagram showing typical voltage variations in the third embodiment of the DC/DC converter of the present invention.

Next, with reference to FIGS. 21 and 22, a description will be given about a third embodiment of the DC/DC converter according to the present invention, which is a modification of the second embodiment of the DC/DC converter 31. In FIGS. 21 and 22, the same elements as in the second embodiment are indicated by the same reference numerals and will not be described to avoid unnecessary duplication.

The third embodiment of the DC/DC converter 41 is constructed to perform voltage-boosting operation. In the voltage-boosting operation, the DC voltage V1 input to the low-voltage-side input port is boosted to the DC voltage V2 at the high-voltage-side input port.

Similarly to the second embodiment, the DC/DC converter 41 includes a smoothing capacitor C1, an inductor (coil) L0, a transformer T1, two switching elements SW1 and SW3, a smoothing capacitor C2, and two diodes 32 and 33. In the third embodiment, the switching elements SW2 and SW4 employed in the second embodiment are omitted and replaced with diodes 42 and 43. The DC voltage V1 is input to the positive-pole terminal TA1 of the low-voltage-side input port, and the DC voltage V2 (>V1) is output to the positive-pole terminal TA2 of the high-voltage-side output port. Reference character E1 represents a common reference terminal (ground terminal).

In the DC/DC converter 41, the diode 42 is connected between the intermediate tap 34 of the primary winding L1 and the output terminal TA2 in a forward direction toward the output terminal TA2 while the diode 43 is connected between the intermediate tap 35 of the secondary winding L2 and the output terminal TA2 in a forward direction toward the output terminal TA2, so as to perform only the voltage-boosting operation. Other arrangements and operation thereof are similar to those in the above-described second embodiment and thus will not be described here to avoid unnecessary duplication.

As an example, FIG. 22 shows voltage variation characteristics at points P1, P2, P3 and P4 (FIG. 21) in the DC/DC converter 41. More specifically, point P1 is a point of the same potential as the gate G1 of the switching element SW1, point P2 is a point of the same potential as the output terminal TA2, point P3 is a high-potential-side point of the secondary line L2 of the transformer T1, and point P4 is a point presenting the same potential as the intermediate tap 35 of the secondary line L2 of the transformer T1.

Output voltage V2 (e.g., 102.59 V) about twice as great as the input voltage V1 (e.g., 59.86 V) is applied to the output terminal TA2 in response to ON/OFF voltage variation of the gate signal SG1 supplied to the switching element SW1.

There was obtained an experimental result that the DC/DC converter 41 having the characteristics of FIG. 22 can vary the voltage-boosting ratio within a range of 1 to 2.8, by varying the duty cycle t2 of the gate signals SG1 and SG3 within a range not exceeding 50%.

For example, in each of the first to third embodiments, the inductance of the inductor L0 is 20 μH, the inductance of the primary and secondary windings L1 and L2 of the transformer T1 is 110 μH, and the capacitance of the smoothing capacitors C1 and C2 is 470 μF. It could be ascertained that the DC/DC converter with such inductance and capacitance can achieve a high conversion efficiency of 95.95%, with a 102.59 V output voltage, 8.89 A output current and 912.90 W output electric power, where the input voltage is 59.86 V, input electric current is 16.24 A and input electric power is 951.40 W.

As set forth above in relation to the conventional techniques, in the case where a voltage booster is implemented by a single inductor, the entire voltage-boosting function is left to the single inductor, and thus, the inductor has to have a great size and weight. Further, where a high voltage-boosting ratio is to be achieved by the single inductor, the electric power conversion efficiency would be undesirably reduced. By contrast, in each of the above-described embodiments of the present invention, the small-sized inductor L0 mainly performs a waveform relaxation/variation function, and the voltage-boosting/lowering operation is performed efficiently by the magnetically-coupling type transformer T. Thus, the present invention can realize a high-efficiency voltage-boosting/lowering function section (L0+T1).

Next, with reference to FIGS. 23-27, a description will be given about a fourth embodiment of the DC/DC converter according to the present invention, which is a modification of the second embodiment of the voltage-boosting/lowering DC/DC converter 31. The fourth embodiment of the DC/DC converter 51 is in the form of electric circuitry which is identical to that of the DC/DC converter 31, except that the above-described inductor L0 of the DC/DC converter 31 is dispensed with. In FIGS. 23-27 pertaining to the fourth embodiment, the same elements as in the second embodiment (or first embodiment) are indicated by the same reference numerals and will not be described to avoid unnecessary duplication.

Figure 23:
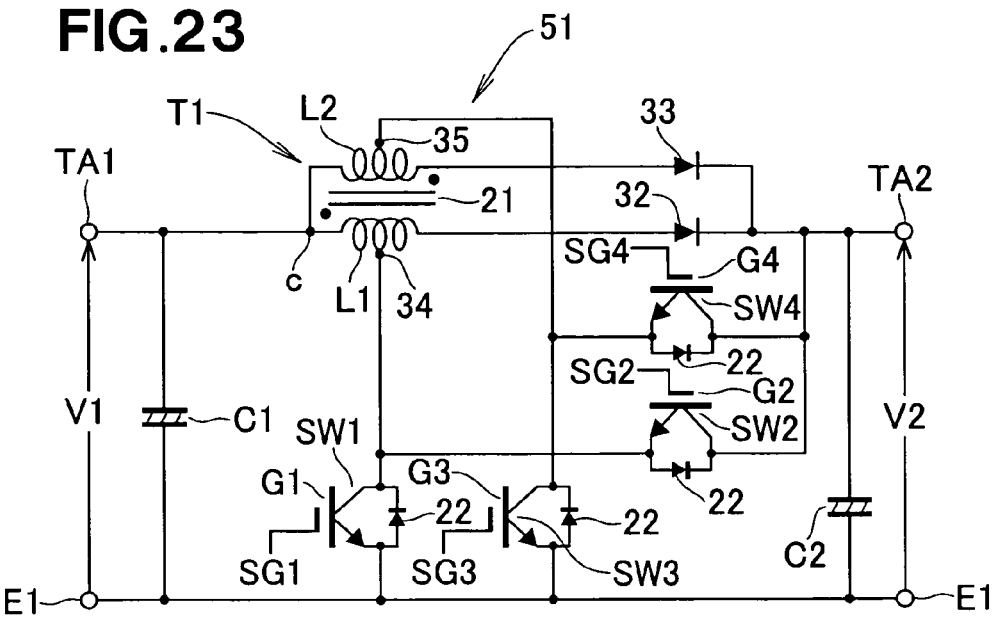
FIG. 23 is an electric circuit diagram showing a fourth embodiment of the DC/DC converter of the present invention.

The fourth embodiment 51 of FIG. 23 is also constructed to perform voltage-boosting and voltage-lowering operation. The voltage-boosting operation of the DC/DC converter 51 is described with reference to FIGS. 24 and 25, and the voltage-lowering operation of the converter 51 is described with reference to FIGS. 26 and 27. Waveforms of various currents flowing in the individual circuit components are described using FIGS. 4, 6, 8, 10, 12 and 14 having been used in the description of the first embodiment.

In FIG. 23, the DC/DC converter 51 is shown as dual-port circuitry (four-terminal circuitry). In the case where the converter 51 should operate as the voltage-boosting DC/DC converter, the left-side port functions as a low-voltage-side input port, while the right-side port functions as a high-voltage-side output port. Conversely, in the case where the converter 51 should operate as the voltage-lowering DC/DC converter, the right-side port functions as a high-voltage-side input port, while the left-side port functions as a low-voltage-side output port.

The voltage-boosting operation of the DC/DC converter 51 is described with reference to FIGS. 24 and 25. In the voltage-boosting operation, the gate signals SG1 and SG3 are given to the respective gates of the switching elements SW1 and SW3, and an OFF signal is given to the gate of each of the switching elements SW2 and SW4. Waveforms of the gate signals SG1 and SG3 are the same as those shown in FIG. 4.

Figure 24:
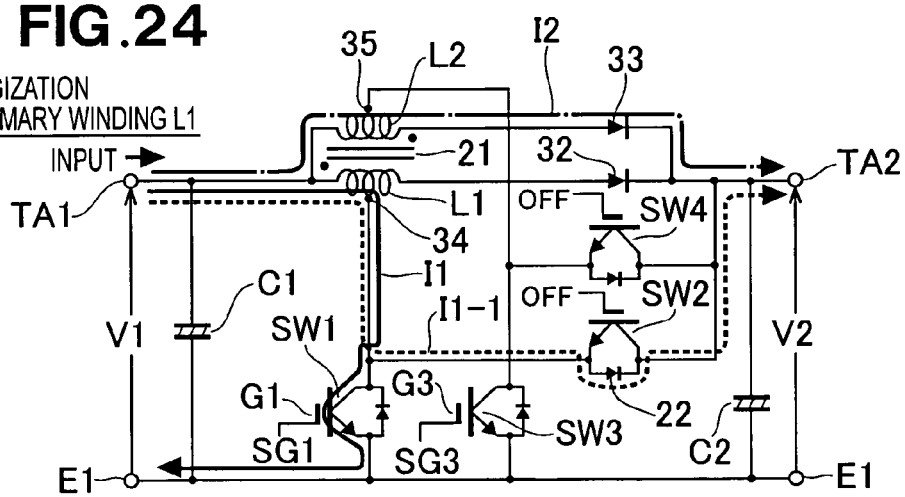
FIG. 24 is a diagram explanatory of a first example of voltage-boosting operation performed by the fourth embodiment of the DC/DC converter.

FIG. 24 shows current flows in the individual circuit components of the DC/DC converter 51 when only the switching element SW1 is turned on, by the gate signal SG1, to energize the primary winding L1 of the transformer T1; during that time, the switching element SW3 is kept in the OFF state by the gate signal SG3. Further, FIG. 25 shows current flows in the individual circuit components of the DC/DC converter 51 when only the switching element SW3 is turned on, by the gate signal SG3, to energize the secondary winding L2 of the transformer T1; during that time, the switching element SW1 is kept in the OFF state by the gate signal SG1.

In the DC/DC converter 51 shown in FIG. 24, the gate signal SG1 is supplied to the gate of the switching element SW1; the switching element SW1 is turned on when the gate signal SG1 is ON. Because the DC voltage V1 has been input to the terminal TA1, an exciting current I1 flows through the primary winding L1 of the transformer T1 via the intermediate tap 34 once the switching element SW1 is turned on. This exciting current I1 flows through a route of the terminal TA1, primary winding L1, intermediate tap 34 and switching element SW1. While the gate signal SG1 is ON, the exciting current I1 gradually increases in level. Once the gate signal SG1 turns into the OFF state, the exciting current I1 decreases in level and ultimately reaches the zero level. Exciting current I1-1, produced for a predetermined time immediately following the turning-off of the gate signal SG1, flows, through the primary winding L1, intermediate tap 34, and diode 22 of the switching element SW2, to the terminal TA2.

As the exciting current I1 flows through the primary winding L1 of the transformer T1, an excited current I2 is produced in the secondary winding L2 on the basis of the mutual induction action. The excited current I2 flows, through the diode 33, to the terminal TA2. The excited current I2 thus produced in the secondary winding L2 has variation characteristics substantially identical in shape to the exciting current I1 and also has similar level values to the exciting current I1 on the basis of the winding ratio (1:1). The smoothing capacitor C2 is charged with the excited current I2, as a result of which the DC voltage V2 is output to the terminal TA2 on the basis of the excited current I2. Variations of the gate signal SG1 and currents I1 and I2 are as shown in FIG. 6 explained above.

Figure 25:
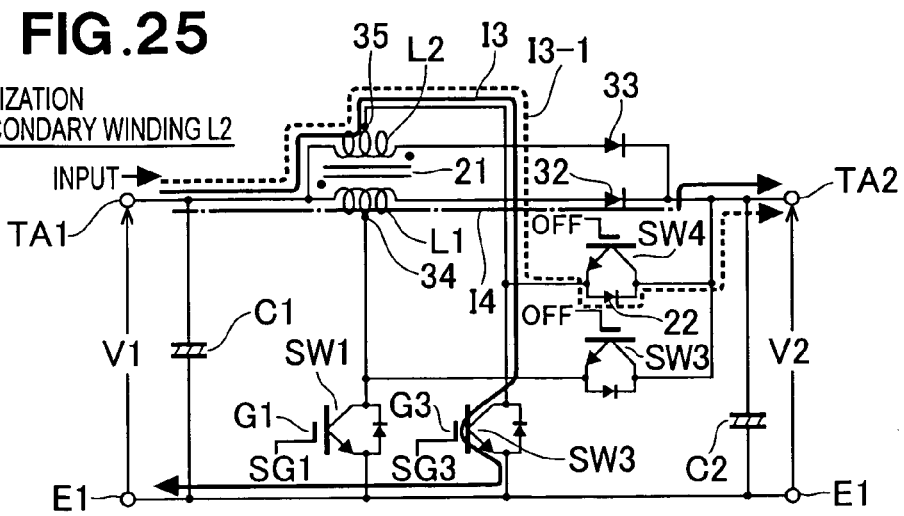
FIG. 25 is a diagram explanatory of a second example of voltage-boosting operation performed by the fourth embodiment of the DC/DC converter.

Referring now to FIG. 25, the gate signal SG3 is supplied to the gate of the switching element SW3 in the DC/DC converter 51; the switching element SW3 is turned on when the gate signal SG3 is ON. The DC voltage V1 has been input to the terminal TA1, and thus, an exciting current I3 flows through the secondary winding L2 of the transformer T1 once the switching element SW3 is turned on. This exciting current I3 flows through a route of the terminal TA1, secondary winding L2, intermediate tap 35 and switching element SW3. While the gate signal SG3 is ON, the exciting current I3 gradually increases in level. Once the gate signal SG3 turns into the OFF state, the exciting current I3 decreases in level and ultimately reaches the zero level. Exciting current I3-1, produced for a predetermined time immediately following the turning-off of the gate signal SG3, flows to the terminal TA2 through the secondary winding L2, intermediate tap 35 and diode 22 of the switching element SW4.

As the exciting current I3 flows through the secondary winding L2 of the transformer T1, an excited current I4 is produced in the primary winding L1 on the basis of the mutual induction action. The excited current I4 thus produced in the primary winding L1 has variation characteristics substantially identical in shape to the exciting current I3 and also has similar level values to the exciting current I3 on the basis of the winding ratio (1:1). The smoothing capacitor C2 is charged with the excited current I4, as a result of which the DC voltage V2 is output to the terminal TA2 on the basis of the excited current I4. Variations of the gate signal SG3 and currents I3 and I4 are as shown in FIG. 8 explained above.

According to the above-described voltage-boosting operation of the DC/DC converter 51, once the switching element SW1 is turned on while the switching element SW3 is turned off, an exciting current flows through the primary winding L1, and simultaneously an excited current flows through the secondary winding L2 in such a direction as to cancel the magnetization of the core 21 and the current (magnetic energy) is then supplied to the output terminal TA2. Further, once the switching element SW3 is turned on while the switching element SW1 is turned off, an exciting current flows through the secondary winding L2, and simultaneously an excited current flows through the primary winding L1 in such a direction as to cancel the magnetization of the core 21 and the current (magnetic energy) is then supplied, through the primary winding L1, to the output terminal TA2. Thus, those currents flow through the primary and secondary windings L1 and L2 of the transformer T1 in opposite directions, so that the DC magnetization in the core 21 is canceled out and thus the core 21 can be prevented from magnetically saturating easily. Thus, even with smaller windings (coils) than the conventional counterparts, the DC/DC converter 51 can appropriately handle greater electric power. Namely, the above-described inventive arrangements can achieve a significant reduction in size (i.e., minitualization) of the DC/DC converter 51.

The function to boost the output voltage V2, produced from the terminal TA2, relative to the input voltage V1 is achieved as an electromotive force induced by the primary and secondary windings L1 and L2. As a consequence, the DC/DC converter 51 can boost the input voltage V1 to a desired level within a range of one to N times the input voltage V1 by varying the duty cycle t2 of the gate signals SG1 and SG3 to a range of 1 to N times within a range not exceeding 50%.

Next, the voltage-lowering operation of the DC/DC converter 51 is described with reference to FIGS. 26 and 27. The above-mentioned gate signals SG2 and SG4 are given to the respective gates of the switching elements SW2 and SW4, while OFF signals are given to the switching elements SW1 and SW3. Waveforms of the gate signals SG2 and SG4 are as shown in FIG. 10 explained above.

Figure 26:
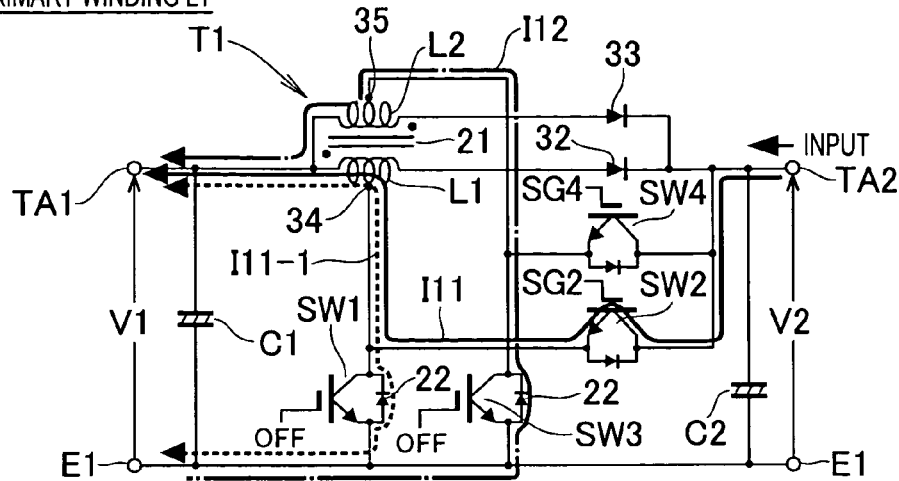
FIG. 26 is a diagram explanatory of a first example of voltage-lowering operation performed by the fourth embodiment of the DC/DC converter.

FIG. 26 shows current flows in the individual circuit components of the DC/DC converter 51 when only the switching element SW2 is turned on to energize the primary winding L1 of the transformer T1. At that time, the switching element SW4 is kept in the OFF state by the gate signal SG4. Further, FIG. 27 shows current flows in the individual circuit components of the DC/DC converter 51 when only the switching element SW4 is turned on to energize the secondary winding L2 of the transformer T1. At that time, the switching element SW2 is kept in the OFF state by the gate signal SG2.

In the DC/DC converter 51 shown in FIG. 26, the gate signal SG2 is supplied to the gate of the switching element SW2 to turn on/off the switching element SW2. The switching element SW2 is kept in the ON state while the gate signal SG2 is ON. Because the DC voltage V2 has been input to the terminal TA2, an exciting current I11 flows through the primary winding L1 of the transformer T1 once the switching element SW2 is turned on. This exciting current I11 flows through a route of the terminal TA2, switching element SW2, intermediate tap 34, primary winding L1 and terminal TA1. While the gate signal SG2 is ON, the exciting current I11 gradually increases in level. Once the gate signal SG2 turns into the OFF state, the exciting current I11 decreases in level and ultimately reaches the zero level. Exciting current I11-1, produced for a predetermined time immediately following the turning-off of the gate signal SG2, flows to the terminal TA1 through the diode 22 of the switching element SW1 and primary winding L1.

As the exciting current I11 flows through the primary winding L1 of the transformer T1 as set forth above, an excited current I12 is produced in the secondary winding L2 on the basis of the mutual induction action as long as V2−V1>V1, but no excited current is produced in the secondary winding L2 if V2−V1<V1. The excited current I12 flows, through the diode 22 of the switching element SW3, to the terminal TA1. The excited current I12 thus produced in the secondary winding L2 has variation characteristics substantially identical in shape to the exciting current I11 and also has similar level values to the exciting current I1 on the basis of the winding ratio (1:1). The smoothing capacitor C1 is charged with the excited current I12, as a result of which the DC voltage V1 is output to the terminal TA1 on the basis of the excited current I12. Variations of the gate signal SG2 and currents I11 and I12 are as shown in FIG. 12 explained above.

Figure 27:
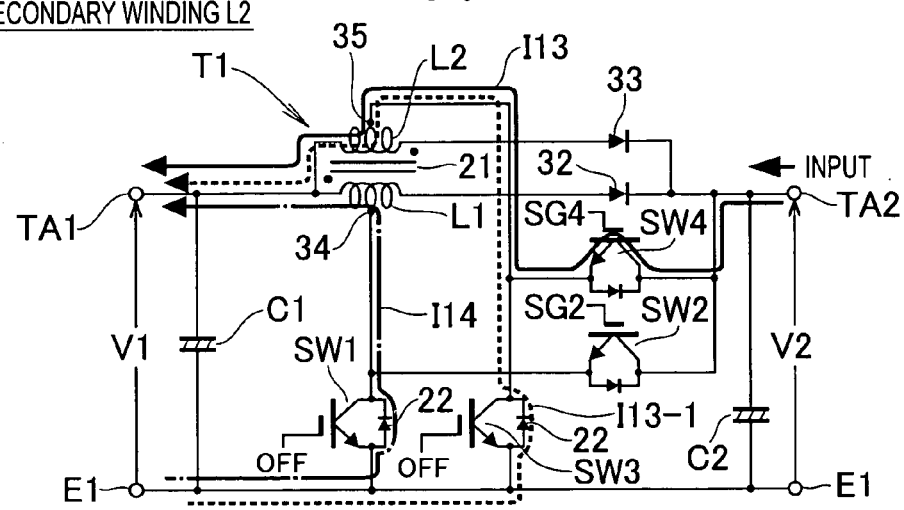
FIG. 27 is a diagram explanatory of a second example of voltage-lowering operation performed by the fourth embodiment of the DC/DC converter.

Referring now to FIG. 27, the gate signal SG4 is supplied to the gate of the switching element SW4 to turn on/off the switching element SW4 in the DC/DC converter 51. The switching element SW4 is kept in the ON state while the gate signal SG4 is ON. The DC voltage V2 has been input to the terminal TA2, and thus, an exciting current I13 flows through the secondary winding L2 of the transformer T1 once the switching element SW4 is turned on. This exciting current I13 flows through a route of the terminal TA2, switching element SW4, intermediate tap 35 and secondary winding L2. While the gate signal SG4 is ON, the exciting current I13 gradually increases in level. Once the gate signal SG4 turns into the OFF state, the exciting current I13 decreases in level and ultimately reaches the zero level. Exciting current I13-1, produced for a predetermined time immediately following the turning-off of the gate signal SG4, flows to the terminal TA1 through the diode 22 of the switching element SW3 and secondary winding L2.

As the exciting current I13 flows through the secondary winding L2 of the transformer T1 as set forth above, an excited current I14 is produced in the primary winding L1 on the basis of the mutual induction action as long as V2−V1>V1, but no excited current is produced in the primary winding L1 if V2−V1<V1. The excited current I14 thus produced in the produced winding L1 has variation characteristics substantially identical in shape to the exciting current I13 and also has similar level values to the exciting current I13 on the basis of the winding ratio (1:1). The smoothing capacitor C1 is charged with the excited current I14, as a result of which the DC voltage V1 is output to the terminal TA1 on the basis of the excited current I14. Variations of the gate signal SG4 and currents I13 and I14 are as shown in FIG. 14 explained above.

Namely, the voltage-lowering operation of the DC/DC converter 51 is carried out as follows. Once the switching element SW2 is turned on while the switching element SW4 is turned off, an exciting current flows through the primary winding L1, and simultaneously an excited current flows through the secondary winding L2 in such a direction as to cancel the magnetization of the core 21 and the current (magnetic energy) is then supplied through the secondary winding L2 to the output terminal TA1. Further, once the switching element SW4 is turned on while the switching element SW2 is turned off, an exciting current flows through the secondary winding L2, and simultaneously an excited current flows through the primary winding L1 in such a direction as to cancel the magnetization of the core 21, and the current (magnetic energy) is then supplied to the output terminal TA1 through the primary winding L1. Thus, those currents flow through the primary and secondary windings L1 and L2 in opposite directions, so that the DC magnetization in the core 21 is canceled out and thus the core 21 can be prevented from magnetically saturating easily. Thus, even with smaller windings (coils) than the conventional counterparts, the DC/DC converter 51 can appropriately handle greater electric power. Namely, the above-described inventive arrangements can achieve a significant reduction in size (i.e., minitualization) of the DC/DC converter 51.

The function to lower the output voltage V1, produced from the terminal TA1, relative to the input voltage V2 is achieved as induced electromotive force by the primary and secondary windings L1 and L2. As a consequence, the DC/DC converter 51 can lower the input voltage V2 to a desired level within a range of zero to 1/N times of the input voltage V2 by varying the duty cycle t2 of the gate signals SG2 and SG4 within a range not exceeding 50%.

Because the magnetic saturation of the core 21 can be prevented by the magnetic-field cancellation action of the magnetic circuit, the fourth embodiment can achieve significant reduction in size and weight of the transformer T1. Further, with the arrangements of the fourth embodiment, the frequency of currents flowing through the windings is twice as high as the switching frequency of each of the switches, and thus, a core material suited for high frequencies, such as ferrite, can be used; as a consequence, it is possible to further reduce the size and weight of the transformer T1. Because the switching frequency of each of the switches in the embodiment is the same as in the conventional techniques, switching elements capable of conducting a high current and withstanding a high voltage, such as IGBTs (Insulator Gate Bipolar Transistors), can be used in the embodiment. Furthermore, with the arrangements of the fourth embodiment, a desired voltage can be provided by appropriately varying the winding division ratio of the tap, without changing the switching frequency.

Figure 28:
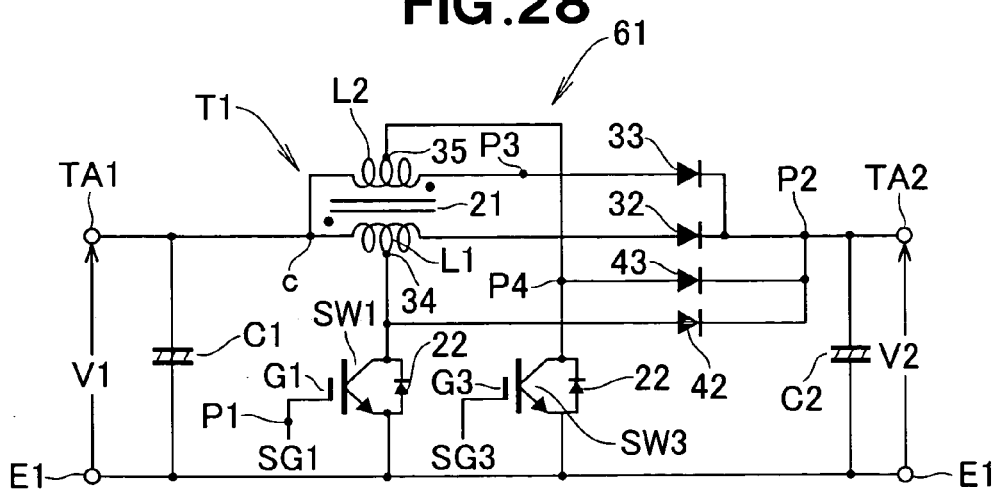
FIG. 28 is an electric circuit diagram showing a fifth embodiment of the DC/DC converter of the present invention.

Next, with reference to FIGS. 28 and 29A and 29B, a description will be given about a fifth embodiment of the DC/DC converter according to the present invention, which is a modification of the third embodiment of the DC/DC converter 41. The fifth embodiment of the DC/DC converter 61 is in the form of electric circuitry which is similar to that of the DC/DC converter 41 except that the above-described inductor L0 of the DC/DC converter 41 is omitted from the DC/DC converter 61. In FIG. 28, the same elements as in the third embodiment are indicated by the same reference numerals and will not be described to avoid unnecessary duplication.

The fifth embodiment of the DC/DC converter 61 is constructed to perform only the voltage-boosting operation. By the voltage-boosting operation of the DC/DC converter 61, the DC voltage V1 input to the low-voltage-side input port is boosted to the DC voltage V2 at the high-voltage-side output port.

Where the intermediate taps are each located at a middle point of the length of the corresponding winding (primary or secondary winding L1 or L2) of the transformer T1, and once the switching element SW1 is turned on, a current flows through one half of the primary winding L1 and the input voltage V is applied to the one half of the primary winding L1, so that a voltage twice as great as the input voltage V (2V) is produced in the secondary winding L2 through the operation of the transformer T1. Therefore, at the output terminal, there is produced a voltage 3V equal to a sum of the input voltage V and voltage 2V produced in the secondary winding L2.

Then, once the switching element SW3 is turned on, a current flows through one half of the secondary winding L2 and the input voltage V is applied to the one half of the secondary winding L2, so that a voltage twice as great as the input voltage V (2V) is produced in the primary winding L1 through the operation of the transformer T1. Therefore, at the output terminal, there is produced a voltage 3V equal to a sum of the input voltage and voltage produced in the primary winding L1.

Then, once the switching element SW1 is turned off, the current, having so far been flowing through the primary winding L1, flows to the output terminal TA2 by way of the switching element SW1 and intermediate tap 34, after which the current can be used effectively. Similarly, once the switching element SW3 is turned off, the current, having so far been flowing through the secondary winding L2, flows to the output terminal TA2 by way of the switching element SW3 and intermediate tap 45, after which the current can be used efficiently.

Where each of the above-mentioned intermediate taps is located at one third the length of the corresponding winding as measured from the left end of the winding, rather than at the middle point of the length of the winding, a voltage three times as great as the input voltage is produced in the other winding, so that, as a whole, a voltage four times as great as the input voltage is output via the output terminal.

Figure 29A:
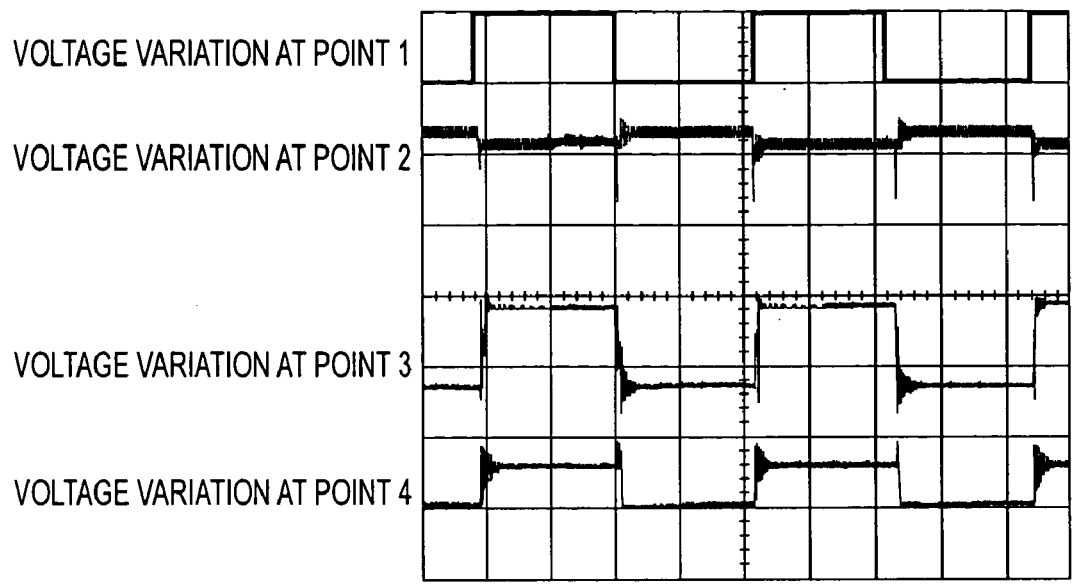
FIGS. 29A and 29B are waveform diagrams showing typical voltage variations in the fifth embodiment of the DC/DC converter of the present invention.
Figure 29B:
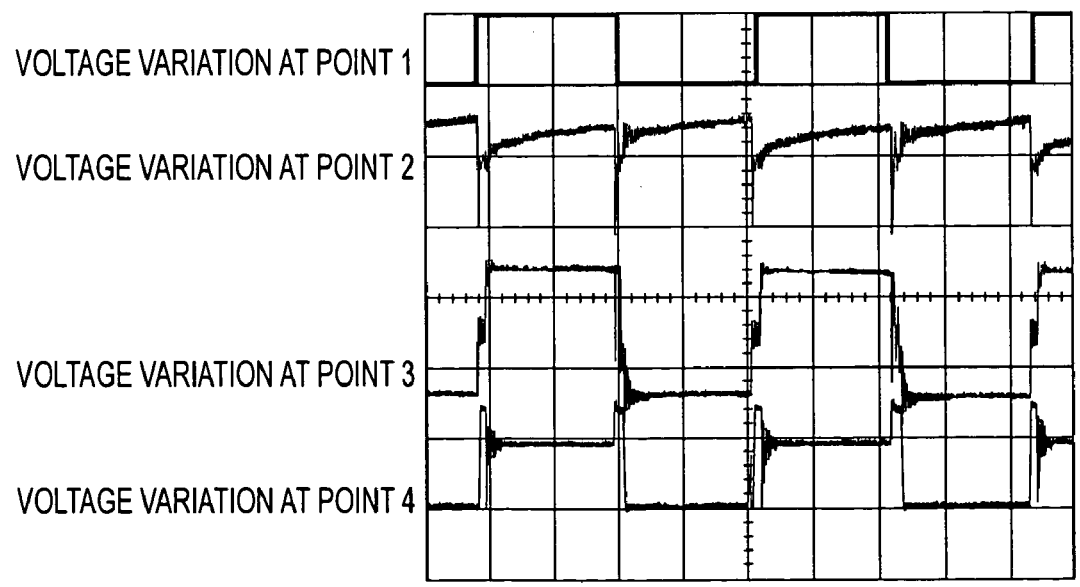

FIGS. 29A and 29B show voltage variation characteristics at points P1, P2, P3 and P4 (FIG. 28) in the DC/DC converter 61. More specifically, point P1 is a point of the same potential as the gate G1 of the switching element SW1, point P2 is a point of the same potential as the output terminal TA2, point P3 is a high-potential-side point of the secondary line L2 of the transformer T1, and point P4 is a point presenting the same potential as the intermediate tap 35 of the secondary line L2 of the transformer T1. Specifically, FIG. 29A shows voltage variation characteristics at points P1, P2, P3 and P4 where the input voltage is 59.79 (V), input current is 20.80 (A), input electric power is 1,228.20 (W), output voltage is 171.58 (V), output current is 6.90 (A), output electric power is 1,186.40 (W) and conversion efficiency is 96.60 (%). FIG. 29B shows voltage variation characteristics at points P1, P2, P3 and P4 where the input voltage 99.63 (V), input current is 31.19 (A), input electric power is 3,070.70 (W), output voltage is 274.39 (V), output current is 10.72 (A), output electric power is 2,939.80 (W) and conversion efficiency is 95.74 (%).

The above-described fifth embodiment of the DC/DC converter 61 can boost the input voltage slightly less than three times, using the intermediate taps located at the middle points of the windings of the transformer T1. Further, if each of the above-mentioned intermediate taps is located at one third the length of the corresponding (e.g., primary or secondary) winding from, for example, the input end of the winding, a voltage three time as great as the input voltage can be produced in the secondary or primary winding opposite to the primary or secondary winding through which a current is flowing, and the input voltage is added to the thus-produced voltage, so that the fifth embodiment can achieve fourfold voltage boosting as a whole.

As set forth above in relation to the conventional techniques, in the case where a voltage booster is implemented by a single inductor, the entire voltage-boosting function is left to the single inductor, and thus, the inductor has to have a great size and weight. Further, where a high voltage-boosting ratio is to be achieved by the single inductor, the electric power conversion efficiency would be undesirably reduced. By contrast, in the present invention, the magnetically-coupling transformer T1 performs the waveform relaxation/variation function to efficiently carry out the voltage-boosting/lowering operation. Thus, the present invention can achieve a high-efficiency voltage-boosting/lowering function section (T1) with a small size and weight.

In the above-described fifth embodiment too, the magnetic saturation of the core 21 can be prevented by the magnetic-field cancellation action of the magnetic circuit, it is possible to achieve significant reduction in size and weight of the transformer T1. Further, with the arrangements of the fifth embodiment, the frequency of currents flowing through the windings is twice as high as the switching frequency of each of the switches, and thus, a core material suited for high frequencies, such as ferrite, can be used; as a consequence, it is possible to further reduce the size and weight of the transformer T1. Because the switching frequency of each of the switches in the embodiment is the same as in the conventional techniques, switching elements capable of conducting a high current and withstanding a high voltage, such as IGBTs (Insulator Gate Bipolar Transistors), can be used in the embodiment. Furthermore, with the arrangements of the fifth embodiment, a desired voltage can be provided by appropriately varying the division ratio of the tap, without changing the switching frequency.

Figure 30:
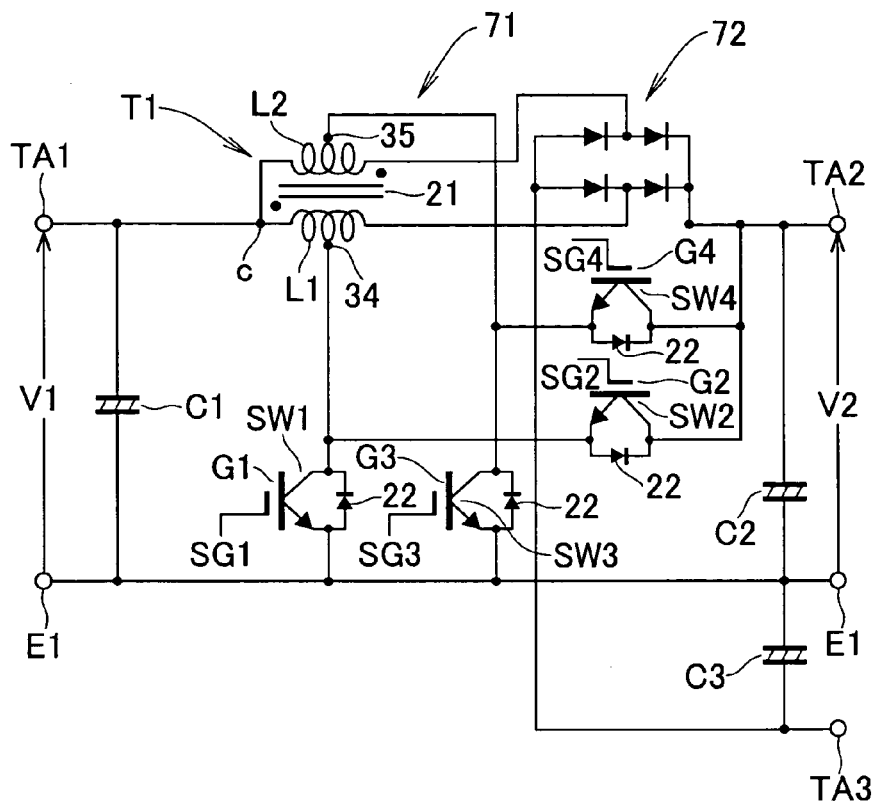
FIG. 30 is an electric circuit diagram showing a sixth embodiment of the DC/DC converter of the present invention.

Next, with reference to FIG. 30, a description will be given about a sixth embodiment of the DC/DC converter according to the present invention, which is a modification of the fourth embodiment of the DC/DC converter 51. In FIG. 30, the same elements as in the fourth embodiment are indicated by the same reference numerals and will not be described to avoid unnecessary duplication.

In this DC/DC converter 71, the right-side terminals of the primary winding L1 and secondary winding L2 of the transformer T1 and the positive-pole terminal TA2 of the high-voltage-side port are connected via a bridge circuit 72 composed of four diodes, in place of the diodes 32 and 33 of the first embodiment. The right-side terminals of the primary winding L1 and secondary winding L2 of the transformer T1 are connected respectively to two input terminals of the bridge circuit 72. Further, on the output side of the DC/DC converter 71, another terminal TA3, functioning as a negative-pole output terminal, is provided in association with the terminal TA2, and a third capacitor C3 is connected between the terminal TA3 and the common reference terminal E1. One of two output terminals of the bright circuit 72 is connected to the terminal TA2, while the other output terminal is connected to the terminal TA3. Other arrangements in the DC/DC converter 71 are similar to those in the fourth embodiment of the DC/DC converter 51.

The sixth embodiment of the DC/DC converter 71 can achieve similar advantageous results to the fourth embodiment of the DC/DC converter 51 and produce a negative voltage (−V) at the terminal TA3.

Figure 31:
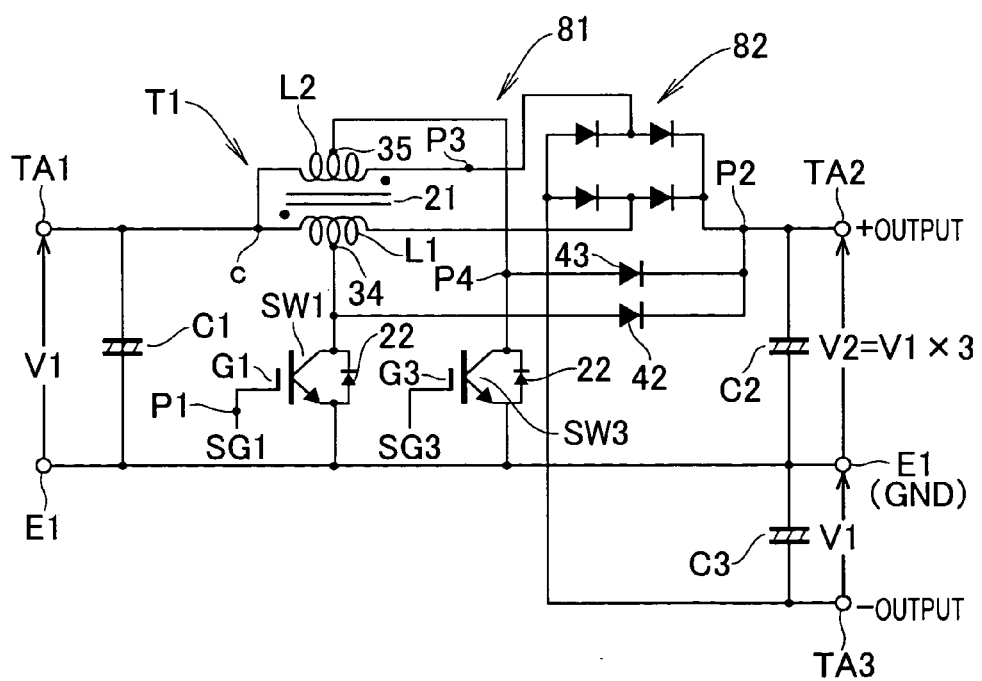
FIG. 31 is an electric circuit diagram showing a seventh embodiment of the DC/DC converter of the present invention.
Figure 32:
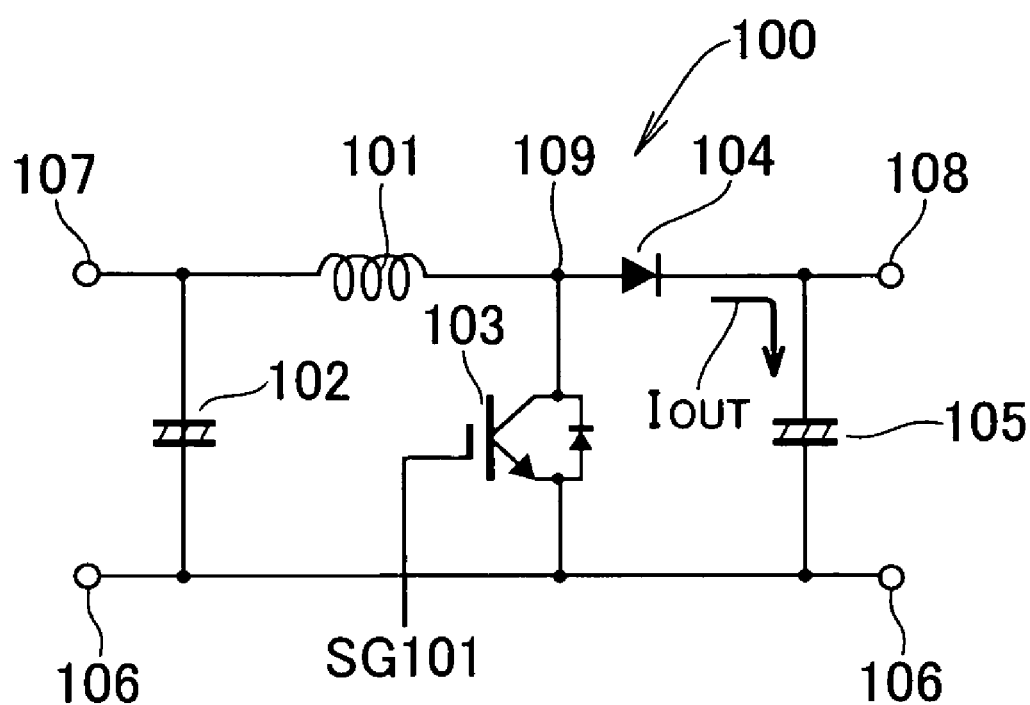
FIG. 32 is an electric circuit diagram showing a fundamental circuit structure of a conventional DC/DC converter.

Next, with reference to FIG. 31, a description will be given about a seventh embodiment of the DC/DC converter according to the present invention, which is a modification of the fifth embodiment of the DC/DC converter 61. In FIG. 31, the same elements as in the fifth embodiment are indicated by the same reference numerals and will not be described to avoid unnecessary duplication.

In this DC/DC converter 81, the right-side terminals of the primary winding L1 and secondary winding L2 of transformer T1 and the positive-pole terminal TA2 of the high-voltage-side port are connected via a bridge circuit 82 composed of four diodes, in place of the diodes 32 and 33 of the second embodiment. The right-side terminals of the primary winding L1 and secondary winding L2 of the transformer T1 are connected respectively to two input terminals of the bridge circuit 82. Further, on the output side of the DC/DC converter 81, another terminal TA3, functioning as a negative-pole output terminal, is provided in association with the terminal TA2, and a third capacitor C3 is connected between the terminal TA3 and the common reference terminal E1. One of two output terminals of the bright circuit 82 is connected to the terminal TA2, while the other output terminal is connected to the terminal TA3. Other arrangements in the DC/DC converter 81 are similar to those in the fifth embodiment of the DC/DC converter 61.

The seventh embodiment of the DC/DC converter 81 can achieve similar advantageous results to the fifth embodiment of the DC/DC converter 61 and produce a negative voltage (−V1) at the terminal TA3, based on the following operation. The intermediate taps are each located at a middle point of the length of the corresponding winding (primary or secondary winding L1 or L2) of the transformer T1, and thus, once the switching element SW1 is turned on, a current flows through the left half of the primary winding L1 and the input voltage V1 is applied to the left half of the primary winding L1. As the input voltage V1 is applied to the left half of the primary winding L1, a voltage V1 is also produced in the right half of the primary winding L1 through the operation of the transformer V1. The voltage thus produced in the right half of the primary winding L1 produces a negative voltage V1 at the terminal TA3 by way of an output-side diode (lower left diode of the bridge circuit 82 in FIG. 31). When the switching element SW3 has been turned on, similar operation takes place so that a voltage produced in the left half of the secondary winding L2 is supplied to the terminal TA3.

Further, because the intermediate taps 34 and 35 are each located at the middle point of the length of the corresponding winding, the seventh embodiment can provide an output voltage V2 three times as great as the input voltage V1. Further, if each of the above-mentioned intermediate taps is located at one third the length of the corresponding winding as measured from the input end of the winding, a voltage twice as great as the input voltage can be produced at the negative (minus) output terminal TA3.

With the seventh embodiment of the DC/DC converter 81, it is possible to not only boost the input voltage three times, four times or the like but also supply the output terminal with a negative voltage of a multiplying factor smaller by two than the multiplying factor of the input voltage boosting (e.g., the multiplying factor of the negative voltage is "1" when the multiplying factor of the input voltage boosting is "3", or the multiplying factor of the negative voltage is "2" when the multiplying factor of the input voltage boosting is "4"). Thus, the seventh embodiment of the DC/DC converter 81 is useful where a minus power supply as well as a main supply is used with the same ground (i.e., earth), or where two types of voltages are required, such as voltages four times as great as the input voltage and twice as great as the input voltage, or voltages five times as great as the input voltage and three times as great as the input voltage.

It should be appreciated that the constructions, shapes, sizes, positional relationships have been explained above in relation to the various embodiments only to the extent that the present invention can be appropriately understood and carried out, and that the numerical values and materials given above are just illustrative. Namely, the present invention should not be construed as limited to the above-described embodiments and may be modified variously unless it departs from the technical scope indicated by the claims.

Obviously, various minor changes and modifications of the present invention are possible in the light of the above teaching. It is therefore to be understood that within the scope of the appended claims the invention may be practiced otherwise than as specifically described.

What is claimed is:

1. A voltage-boosting/lowering DC/DC converter including a low-voltage-side port and high-voltage-side port, said voltage-boosting/lowering DC/DC converter comprising:
   an inductor connected at one end to a positive-pole terminal of the low-voltage-side port;
   a transformer of a magnetic-field cancellation type including a primary winding and secondary winding interconnected in an oppositely-wound configuration, a common terminal of the primary winding and secondary winding being connected to another end of said inductor;
   first switching means for controlling an energizing current of the primary winding which flows to a common reference terminal;
   second switching means for controlling the energizing current of the primary winding which flows to a positive-pole terminal of the low-voltage-side port;
   third switching means for controlling an energizing current of the secondary winding which flows to the common reference terminal; and
   fourth switching means for controlling the energizing current of the secondary winding which flows to the positive-pole terminal of the low-voltage-side port.

2. A voltage-boosting/lowering DC/DC converter according to claim 1 wherein ON/OFF control signals are supplied by a control means to said first switching means and said third switching means so that respective ON/OFF action of said first switching means and said third switching means are controlled in an alternate manner, to perform voltage-boosting operation.

3. A voltage-boosting/lowering DC/DC converter according to claim 2 wherein a duty cycle of each of the ON/OFF control signals is variable to provide a variable voltage-boosting ratio.

4. A voltage-boosting/lowering DC/DC converter according to claim 1 wherein ON/OFF control signals are supplied by a control means to said second switching means and said fourth switching means so that respective ON/OFF action of said second switching means and said fourth switching means are controlled in an alternate manner, to perform voltage-lowering operation.

5. A voltage-boosting/lowering DC/DC converter according to claim 4 wherein a duty cycle of each of the ON/OFF control signals is variable to provide a variable voltage-lowering ratio.

6. A voltage-boosting/lowering DC/DC converter including a low-voltage-side port and high-voltage-side port, said voltage-boosting/lowering DC/DC converter comprising:
   an inductor connected at one end to a positive-pole terminal of the low-voltage-side port;
   a transformer of a magnetic-field-cancellation type including a primary winding and secondary winding interconnected in an oppositely-wound configuration, a common terminal of the primary and secondary windings being connected to another end of the inductor;
   a first diode for connecting another terminal of the primary winding of said transformer and a positive-pole terminal of the high-voltage-side port;
   a second diode for connecting another terminal of the secondary winding of said transformer and the positive-pole terminal of the high-voltage-side port;
   first switching means, connected between an intermediate tap of the primary winding and a common reference terminal, for controlling a current flowing from the intermediate tap of the primary winding to the common reference terminal;
   second switching means, connected between the intermediate tap of the primary winding and the positive-pole terminal of the high-voltage-side port, for controlling a current flowing from the intermediate tap of the primary winding to the positive-pole terminal of the low-voltage-side port;
   third switching means, connected between an intermediate tap of the secondary winding and the common reference terminal, for controlling a current flowing from the intermediate tap of the secondary winding to the common reference terminal; and
   fourth switching means, connected between the intermediate tap of the secondary winding and the positive-pole terminal of the high-voltage-side port, for controlling a current flowing from the intermediate tap of the secondary winding to the positive-pole terminal of the low-voltage-side port.

7. A voltage-boosting/lowering DC/DC converter according to claim 6 wherein ON/OFF control signals are supplied by a control means to said first switching means and said third switching means so that respective ON/OFF action of said first switching means and said third switching means are controlled in an alternate manner, to perform voltage-boosting operation.

8. A voltage-boosting/lowering DC/DC converter according to claim 7 wherein a duty cycle of each of the ON/OFF control signals is variable to provide a variable voltage-boosting ratio.

9. A voltage-boosting/lowering DC/DC converter according to claim 6 wherein ON/OFF control signals are supplied by a control means to said second switching means and said fourth switching means so that respective ON/OFF action of said second switching means and said fourth switching means are controlled in an alternate manner, to perform voltage-lowering operation.

10. A voltage-boosting/lowering DC/DC converter according to claim 9 wherein a duty cycle of each of the ON/OFF control signals is variable to provide a variable voltage-lowering ratio.

11. A voltage-boosting/lowering DC/DC converter according to claim 6 wherein the voltage-boosting ratio is set depending on a winding ratio that is determined by a position of the intermediate tap of the primary winding.

12. A voltage-boosting DC/DC converter including a low-voltage-side port and high-voltage-side port, said voltage-boosting DC/DC converter comprising:
   an inductor connected at one end to a positive-pole terminal of the low-voltage-side port;
   a transformer of a magnetic-field cancellation type including a primary winding and secondary winding interconnected in an oppositely-wound configuration, a common terminal of the primary winding and secondary winding being connected to another end of said inductor;

a first diode for connecting another terminal of the primary winding of said transformer and a positive-pole terminal of the high-voltage-side port;

a second diode for connecting another terminal of the secondary winding of said transformer and the positive-pole terminal of the high-voltage-side port;

first switching means, connected between an intermediate tap of the primary winding and a common reference terminal, for controlling a current flowing from the intermediate tap of the primary winding to the common reference terminal;

a third diode, connected between the intermediate tap of the primary winding and the positive-pole terminal of the high-voltage-side port, for directing a current from the intermediate tap of the primary winding to the positive-pole terminal of the high-voltage-side port;

second switching means, connected between an intermediate tap of the secondary winding and the common reference terminal, for controlling a current flowing from the intermediate tap of the secondary winding to the common reference terminal; and a fourth diode, connected between the intermediate tap of the secondary winding and the positive-pole terminal of the high-voltage-side port, for directing a current from the intermediate tap of the secondary winding to the positive-pole terminal of the high-voltage-side port.

13. A voltage-boosting DC/DC converter according to claim 12 wherein ON/OFF control signals are supplied by a control means to said first switching means and said second switching means so that respective ON/OFF action of said first switching means and said second switching means are controlled in an alternate manner, to perform voltage-boosting operation.

14. A voltage-boosting DC/DC converter according to claim 13 wherein a duty cycle of each of the ON/OFF control signals is variable to provide a variable voltage-boosting ratio.

15. A voltage-boosting/lowering DC/DC converter including a low-voltage-side port and high-voltage-side port, said voltage-boosting/lowering voltage-boosting DC/DC converter comprising:

a transformer of a magnetic-field cancellation type including a primary winding and secondary winding interconnected in an oppositely-wound configuration, a common terminal of the primary winding and secondary winding being connected to another end of said inductor;

a first diode for connecting another terminal of the primary winding of said transformer and a positive-pole terminal of the high-voltage-side port;

a second diode for connecting another terminal of the secondary winding of said transformer and the positive-pole terminal of the high-voltage-side port;

first switching means, connected between an intermediate tap of the primary winding and a common reference terminal, for controlling a current flowing from the intermediate tap of the primary winding to the common reference terminal;

second switching means, connected between the intermediate tap of the primary winding and the positive-pole terminal of the high-voltage-side port, for controlling a current flowing from the intermediate tap of the primary winding to the positive-pole terminal of the low-voltage-side port;

third switching means, connected between the intermediate tap of the secondary winding and the common reference terminal, for controlling a current flowing from the intermediate tap of the secondary winding to the common reference terminal; and fourth switching means, connected between the intermediate tap of the secondary winding and the positive-pole terminal of the high-voltage-side port, for controlling a current flowing from the intermediate tap of the secondary winding to the positive-pole terminal of the low-voltage-side port.

16. A voltage-boosting/lowering DC/DC converter according to claim 15 wherein ON/OFF control signals are supplied by a control means to said first switching means and said third switching means so that respective ON/OFF action of said first switching means and said third switching means are controlled in an alternate manner, to perform voltage-boosting operation.

17. A voltage-boosting/lowering DC/DC converter according to claim 16 wherein a duty cycle of each of the ON/OFF control signals is variable to provide a variable voltage-boosting ratio.

18. A voltage-boosting/lowering DC/DC converter according to claim 15 wherein ON/OFF control signals are supplied by a control means to said second switching means and said fourth switching means so that respective ON/OFF action of said second switching means and said fourth switching means are controlled in an alternate manner, to perform voltage-lowering operation.

19. A voltage-boosting/lowering DC/DC converter according to claim 18 wherein a duty cycle of each of the ON/OFF control signals is variable to provide a variable voltage-lowering ratio.

20. A voltage-boosting/lowering DC/DC converter according to claim 15 wherein the voltage-boosting ratio and voltage-lowering ratio are set depending on a winding ratio that is determined by a position of the intermediate tap of the primary winding.

21. A voltage-boosting/lowering DC/DC converter according to claim 15 wherein the other ends of the primary and secondary windings and the positive-pole terminal of the high-voltage-side port are interconnected by a bridge circuit in place of said first diode and said second diode, a negative-pole output terminal is provided in the high-voltage-side port, a capacitor is connected between said negative-pole output terminal and the common reference terminal, and one terminal in a high-voltage port of the bridge circuit is connected with the positive-pole terminal of the high-voltage-side port, and another terminal in the high-voltage port of the bridge circuit is connected with said negative-pole output terminal.

22. A voltage-boosting DC/DC converter including a low-voltage-side port and high-voltage-side port, said voltage-boosting DC/DC converter comprising:

a transformer of a magnetic-field cancellation type including a primary winding and secondary winding interconnected in an oppositely-wound configuration, a common terminal of the primary winding and secondary winding being connected to a positive-pole terminal of the low-voltage-side port;

a first diode for connecting another terminal of the primary winding of said transformer and a positive-pole terminal of the high-voltage-side port;

a second diode for connecting another terminal of the secondary winding of said transformer and the positive-pole terminal of the high-voltage-side port;

first switching means, connected between an intermediate tap of the primary winding and a common reference terminal, for controlling a current flowing from the intermediate tap of the primary winding to the common reference terminal;

a third diode, connected between the intermediate tap of the primary winding and the positive-pole terminal of the high-voltage-side port, for directing the current from the intermediate tap of the primary winding to the positive-pole terminal of the high-voltage-side port;

second switching means, connected between an intermediate tap of the secondary winding and the common reference terminal, for controlling a current flowing from the intermediate tap of the secondary winding to the common reference terminal; and a fourth diode, connected between the intermediate tap of the secondary winding and the positive-pole terminal of the high-voltage-side port, for directing a current from the intermediate tap of the secondary winding to the positive-pole terminal of the high-voltage-side port.

23. A voltage-boosting DC/DC converter according to claim 22 wherein ON/OFF control signals are supplied by a control means to said first switching means and said second switching means so that respective ON/OFF action of said first switching means and said second switching means are controlled in an alternate manner, to perform voltage-boosting operation.

24. A voltage-boosting DC/DC converter according to claim 23 wherein a duty cycle of each of the ON/OFF control signals is variable to provide a variable voltage-boosting ratio.

25. A voltage-boosting DC/DC converter according to claim 22 wherein the other ends of the primary and secondary windings and the positive-pole terminal of the high-voltage-side port are interconnected by a bridge circuit in place of said first diode and said second diode, a negative-pole output terminal is provided in the high-voltage-side port, a capacitor is connected between said negative-pole output terminal and the common reference terminal, and one terminal in a high-voltage port of the bridge circuit is connected with the positive-pole terminal of the high-voltage-side port, and another terminal in the high-voltage port of the bridge circuit is connected with said negative-pole output terminal.

* * * * *